US012035284B2

United States Patent
Sundaram et al.

(10) Patent No.: US 12,035,284 B2
(45) Date of Patent: Jul. 9, 2024

(54) CARRIER CONFIGURATION SECTION TYPE AND ANALOG BEAMFORMING EXTENSION

(71) Applicant: QUALCOMM Incorporated, San Diego, CA (US)

(72) Inventors: Senthilkumar Sundaram, San Diego, CA (US); Christian Oliver Thelen, San Diego, CA (US); Kaushal Parikh, San Diego, CA (US); Michael Francis Garyantes, Bradley Beach, NJ (US); Abhishek Saurabh Sachidanand Sinha, Malmo (SE); Deepak Agarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/445,563

(22) Filed: Aug. 20, 2021

(65) Prior Publication Data
US 2023/0057921 A1     Feb. 23, 2023

(51) Int. Cl.
| | | |
|---|---|---|
| *H04W 72/044* | (2023.01) | |
| *H04L 5/00* | (2006.01) | |
| *H04L 5/14* | (2006.01) | |

(52) U.S. Cl.
CPC ......... *H04W 72/044* (2013.01); *H04L 5/0032* (2013.01); *H04L 5/14* (2013.01)

(58) Field of Classification Search
None
See application file for complete search history.

(56) References Cited

U.S. PATENT DOCUMENTS

| | | | | |
|---|---|---|---|---|
| 2021/0120531 | A1* | 4/2021 | Jeon | H04W 72/046 |
| 2021/0126760 | A1* | 4/2021 | Lee | H04L 5/0005 |
| 2021/0135722 | A1* | 5/2021 | Ahmed | H04B 7/0634 |
| 2021/0136788 | A1* | 5/2021 | Lim | H04W 72/1278 |
| 2021/0218608 | A1* | 7/2021 | Rama Chandran | H04L 27/2678 |
| 2021/0243840 | A1* | 8/2021 | Raghothaman | H04W 88/085 |
| 2022/0086890 | A1* | 3/2022 | Kim | H04W 8/26 |

(Continued)

OTHER PUBLICATIONS

O-Ran Alliance, O-RAN.WG4.CUS.0-v04.00 Technical Specification, Control, User, and Synchronization Plane Specification (Year: 2020).*

(Continued)

*Primary Examiner* — Benjamin Lamont
(74) *Attorney, Agent, or Firm* — QUALCOMM Incorporated

(57) ABSTRACT

Various aspects of the present disclosure generally relate to wireless communication. In some aspects, a radio unit (RU) may receive, from a distributed unit (DU), a control plane message associated with a section type that is dedicated for information that applies to all resource blocks and spatial layers in a group of carriers or band sectors, wherein the control plane message includes information that applies to all resource blocks and spatial layers in an indicated group of carriers or band sectors. The RU may perform beamforming for one or more communications with a user equipment (UE) based at least in part on the information included in the control plane message. Numerous other aspects are described.

30 Claims, 14 Drawing Sheets

(56) References Cited

U.S. PATENT DOCUMENTS

| | | | |
|---|---|---|---|
| 2023/0231686 A1* | 7/2023 | Jeon | H04L 5/0091 |
| | | | 370/329 |
| 2023/0246782 A1* | 8/2023 | Hunukumbure | H04L 5/14 |
| | | | 370/280 |

OTHER PUBLICATIONS

International Search Report and Written Opinion—PCT/US2022/073882—ISA/EPO—dated Oct. 17, 2022.

* cited by examiner

Ecpri Transport Header

| Section Type: any | | | | | | | | # of bytes | |
|---|---|---|---|---|---|---|---|---|---|
| 0 (msb) | 1 | 2 | 3 | 4 | 5 | 6 | 7 (lsb) | | |
| ecpriVersion | | | | | ecpriReserved | | ecpriConcat. | 1 | Octet 1 |
| ecpriMessage | | | | | | | | 1 | Octet 2 |
| ecpriPayload | | | | | | | | 2 | Octet 3 |
| ecpriRtcid / ecpriPcid | | | | | | | | 2 | Octet 5 |
| ecpriSeqid | | | | | | | | 2 | Octet 7 |

| bit0 | 1 | 2 | 3 | 4 | 5 | 6 | 7 | #bytes |
|---|---|---|---|---|---|---|---|---|
| ef | extType = 0x15 | | | | | | | 1 |
| extLen = [15:0] | | | | | | | | 2 |
| res | analogBeam0 [15:8] | | | | | | | 1 |
| analogBeam0 [7:0] | | | | | | | | 1 |
| ••• | | | | | | | | |
| res | analogBeamN [15:8] | | | | | | | 1 |
| analogBeamN [7:0] | | | | | | | | 1 |

CARRIER CONFIGURATION SECTION TYPE AND ANALOG BEAMFORMING EXTENSION

FIELD OF THE DISCLOSURE

Aspects of the present disclosure generally relate to wireless communication and to techniques and apparatuses for a carrier configuration section type and an analog beamforming extension in an open radio access network (O-RAN).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of a transport header for a message in an O-RAN, in accordance with the present disclosure.

FIGS. 6-8 are diagrams illustrating examples associated with a carrier configuration section type and an analog beamforming extension in an O-RAN, in accordance with the present disclosure.

SUMMARY

Figure 1:
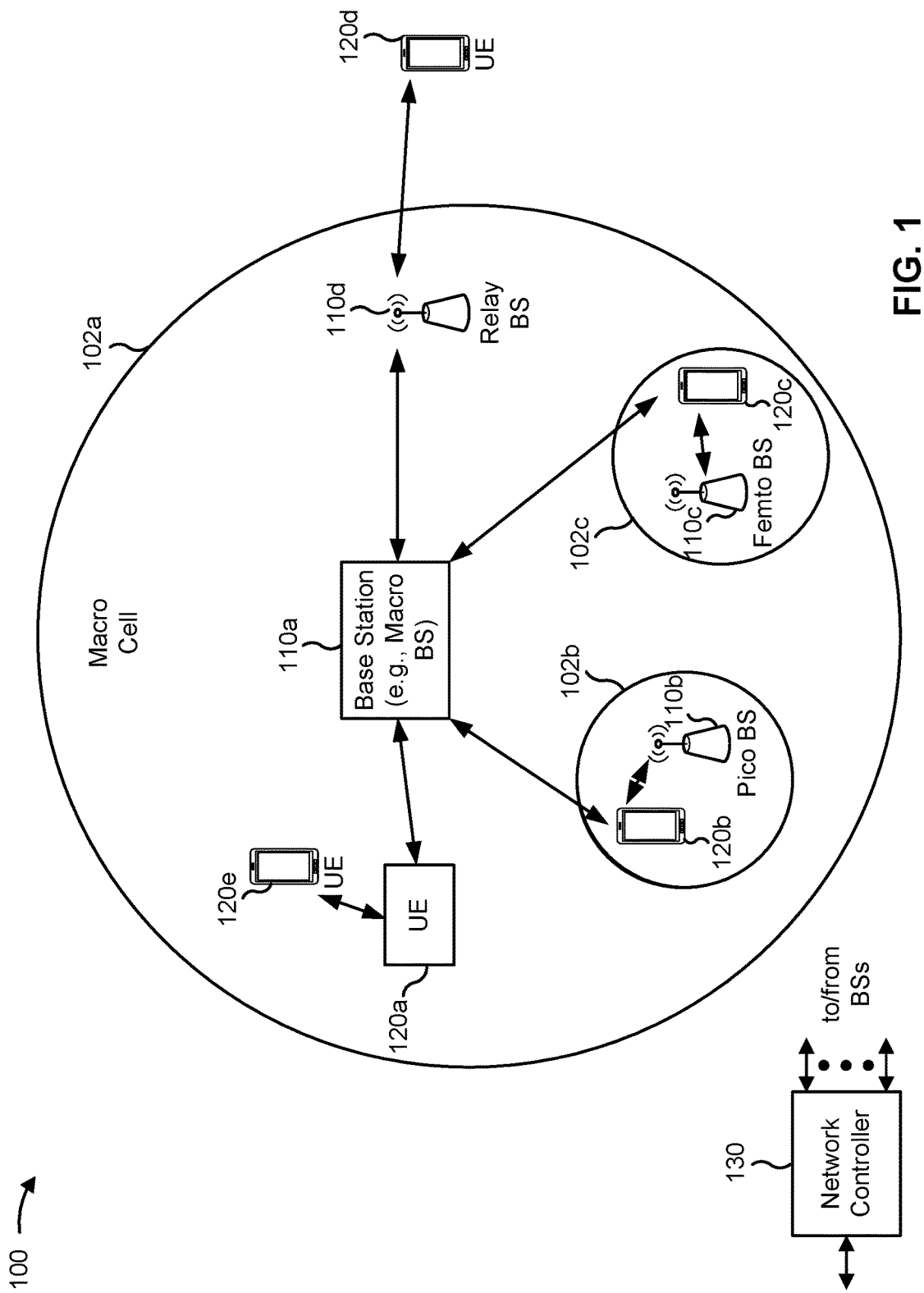
FIG. 1 is a diagram illustrating an example of a wireless network, in accordance with the present disclosure.

Some aspects described herein relate to a radio unit (RU) for wireless communication. The radio unit may include a memory and one or more processors coupled to the memory. The one or more processors may be configured to receive, from a distributed unit (DU), a control plane message associated with a section type that is dedicated for information that applies to all resource blocks and spatial layers in a group of carriers or band sectors, wherein the control plane message includes information that applies to all resource blocks and spatial layers in an indicated group of carriers or band sectors. The one or more processors may be configured to perform beamforming for one or more communications with a user equipment (UE) based at least in part on the information included in the control plane message.

Some aspects described herein relate to an RU for wireless communication. The radio unit may include a memory and one or more processors coupled to the memory. The one or more processors may be configured to receive, from a DU, a control plane message that includes analog beamforming information that applies to all resource blocks and spatial layers in one or more carriers. The one or more processors may be configured to perform beamforming for one or more communications with a UE based at least in part on the analog beamforming information.

Some aspects described herein relate to a method of wireless communication performed by an RU. The method may include receiving, from a DU, a control plane message associated with a section type that is dedicated for information that applies to all resource blocks and spatial layers in a group of carriers or band sectors, wherein the control plane message includes information that applies to all resource blocks and spatial layers in an indicated group of carriers or band sectors. The method may include performing beamforming for one or more communications with a UE based at least in part on the information included in the control plane message.

Some aspects described herein relate to a method of wireless communication performed by an RU. The method may include receiving, from a DU, a control plane message that includes analog beamforming information that applies to all resource blocks and spatial layers in one or more carriers. The method may include performing beamforming for one or more communications with a UE based at least in part on the analog beamforming information.

Some aspects described herein relate to a non-transitory computer-readable medium that stores a set of instructions for wireless communication by an RU. The set of instructions, when executed by one or more processors of the RU, may cause the RU to receive, from a DU, a control plane message associated with a section type that is dedicated for information that applies to all resource blocks and spatial layers in a group of carriers or band sectors, wherein the control plane message includes information that applies to all resource blocks and spatial layers in an indicated group of carriers or band sectors. The set of instructions, when executed by one or more processors of the RU, may cause the RU to perform beamforming for one or more communications with a UE based at least in part on the information included in the control plane message.

Some aspects described herein relate to a non-transitory computer-readable medium that stores a set of instructions for wireless communication by a RU. The set of instructions, when executed by one or more processors of the RU, may cause the RU to receive, from a DU, a control plane message that includes analog beamforming information that applies to all resource blocks and spatial layers in one or more carriers. The set of instructions, when executed by one or more processors of the RU, may cause the RU to perform beamforming for one or more communications with a UE based at least in part on the analog beamforming information.

Some aspects described herein relate to an apparatus for wireless communication. The apparatus may include means for receiving, from a DU, a control plane message associated with a section type that is dedicated for information that applies to all resource blocks and spatial layers in a group of carriers or band sectors, wherein the control plane message includes information that applies to all resource blocks and spatial layers in an indicated group of carriers or band sectors. The apparatus may include means for performing beamforming for one or more communications with a UE based at least in part on the information included in the control plane message.

Some aspects described herein relate to an apparatus for wireless communication. The apparatus may include means for receiving, from a DU, a control plane message that includes analog beamforming information that applies to all resource blocks and spatial layers in one or more carriers. The apparatus may include means for performing beamforming for one or more communications with a UE based at least in part on the analog beamforming information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
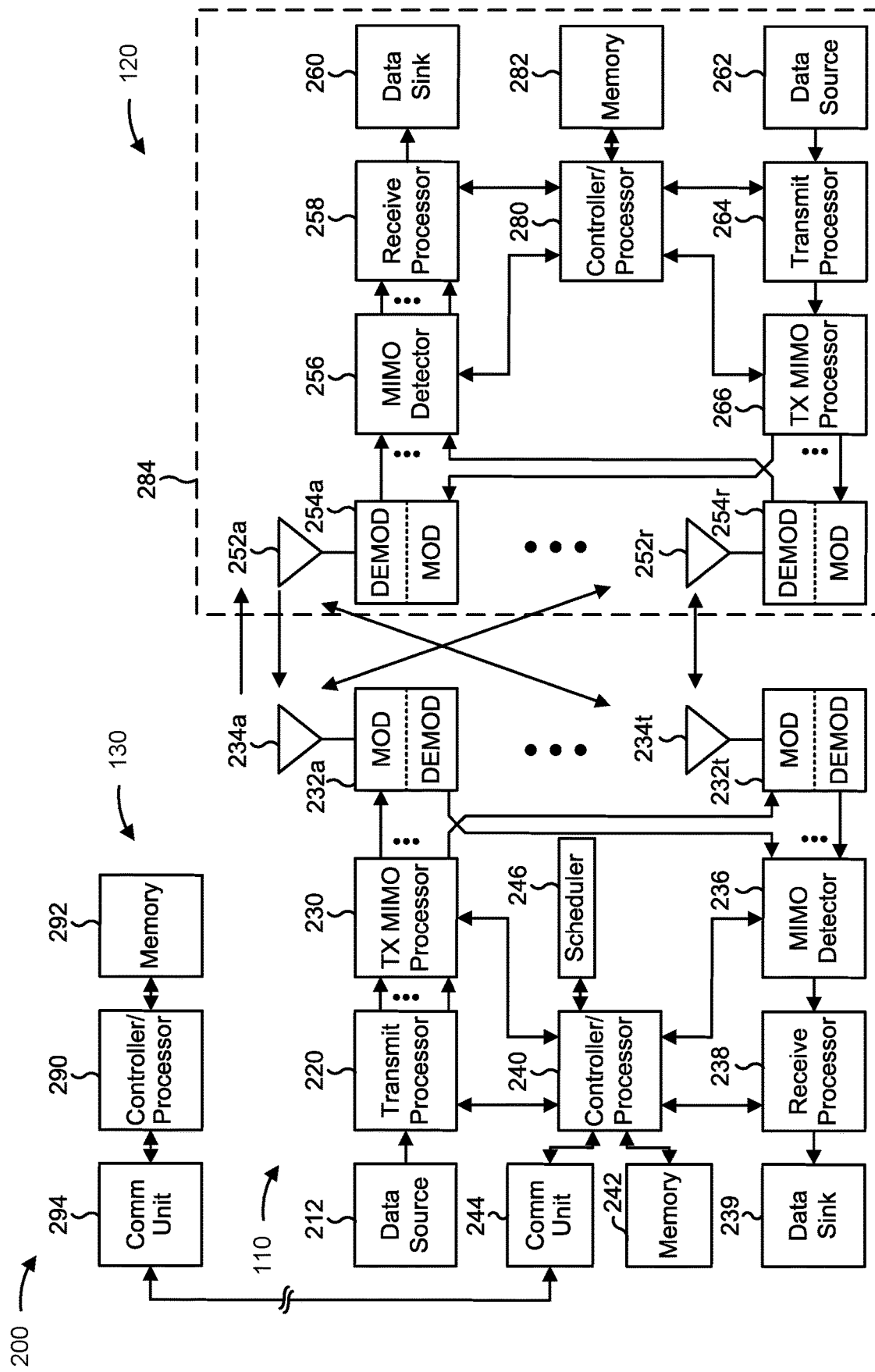
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode)

the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-14).

The controller/processor 240 of the base station 110, the controller/processor 280 of the UE 120, and/or any other component(s) of FIG. 2 may perform one or more techniques associated with a carrier configuration section type and an analog beamforming extension in an open radio access network (O-RAN), as described in more detail elsewhere herein. In some aspects, the radio unit (RU) described herein is the base station 110, is included in the base station 110, or includes one or more components of the base station 110 shown in FIG. 2. In some aspects, the distributed unit (DU) described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the RU includes means for receiving, from a DU, a control plane message associated with a section type that is dedicated for information that applies to all resource blocks and spatial layers in a group of carriers or band sectors, wherein the control plane message includes information that applies to all resource blocks and spatial layers in an indicated group of carriers or band sectors; and/or means for performing beamforming for one or more communications with a UE based at least in part on the information included in the control plane message. In some aspects, the means for the RU to perform operations described herein may include, for example, one or more of transmit processor 220, TX MIMO processor 230, modem 232, antenna 234, MIMO detector 236, receive processor 238, controller/processor 240, memory 242, or scheduler 246.

In some aspects, the RU includes means for receiving, from a DU, a control plane message that includes analog beamforming information that applies to all resource blocks and spatial layers in one or more carriers; and/or means for performing beamforming for one or more communications with a UE based at least in part on the analog beamforming information. In some aspects, the means for the RU to perform operations described herein may include, for example, one or more of transmit processor 220, TX MIMO processor 230, modem 232, antenna 234, MIMO detector 236, receive processor 238, controller/processor 240, memory 242, or scheduler 246.

In some aspects, the DU includes means for transmitting, to an RU, a control plane message associated with a section type that is dedicated for information that applies to all resource blocks and spatial layers in a group of carriers or band sectors, wherein the control plane message includes information that applies to all resource blocks and spatial layers in an indicated group of carriers or band sectors. In some aspects, the means for the DU to perform operations described herein may include, for example, one or more of transmit processor 220, TX MIMO processor 230, modem 232, antenna 234, MIMO detector 236, receive processor 238, controller/processor 240, memory 242, or scheduler 246.

In some aspects, the DU includes means for transmitting, to an RU, a control plane message that includes analog beamforming information that applies to all resource blocks and spatial layers in one or more carriers. In some aspects, the means for the DU to perform operations described herein may include, for example, one or more of transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
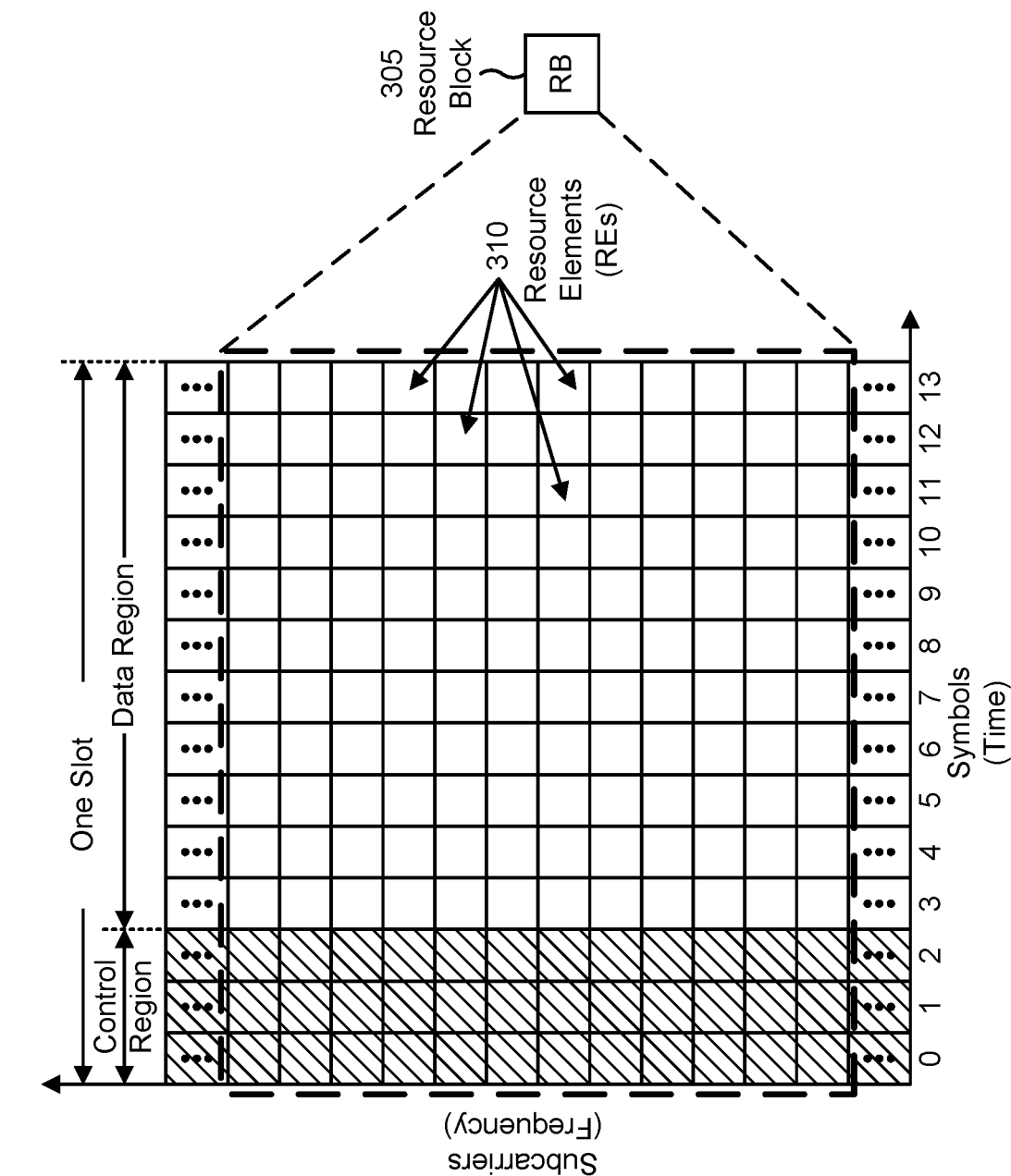
FIG. 3 is a diagram illustrating an example of a slot format, in accordance with the present disclosure.

FIG. 3 is a diagram illustrating an example 300 of a slot format, in accordance with the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable by a base station 110 as a unit. In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some aspects, the link direction for a slot may be dynamically configured. As shown in FIG. 3, in some examples, an RB 305 may include a control region and a data region. In 5G/NR, the control region may be an optional control region, and may not be present in all RBs 305. In a case in which the control region is absent in an RB 305, that region can be used for data.

As indicated above, FIG. 3 is provided as an example. Other examples may differ from what is described with respect to FIG. 3.

Figure 4:
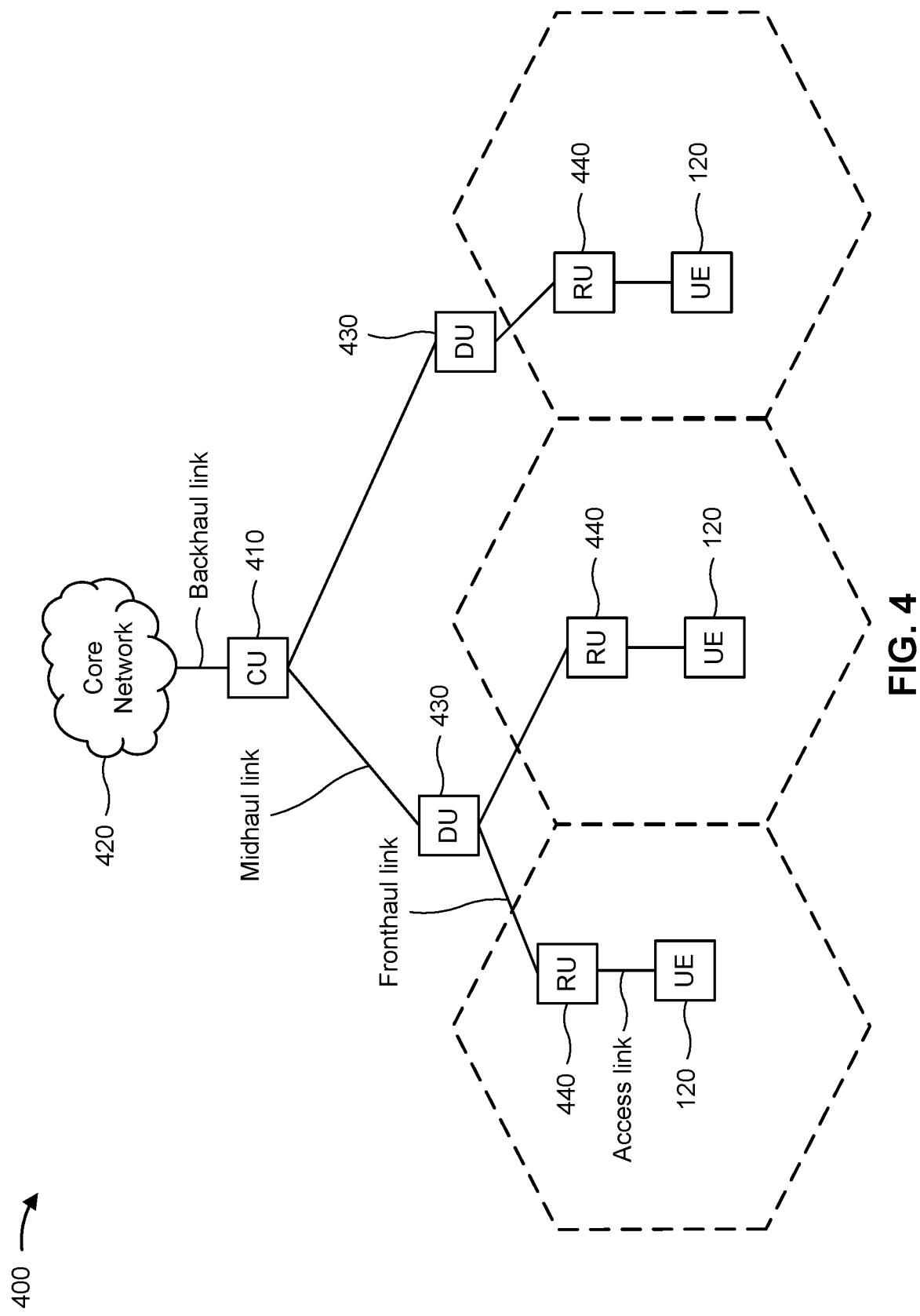
FIG. 4 is a diagram illustrating an example of an open radio access network (O-RAN) architecture, in accordance with the present disclosure.

FIG. 4 is a diagram illustrating an example 400 of an O-RAN architecture, in accordance with the present disclosure. As shown in FIG. 4, the O-RAN architecture may include a control unit (CU) 410 that communicates with a core network 420 via a backhaul link. Furthermore, the CU 410 may communicate with one or more DUs 430 via respective midhaul links. The DUs 430 may each communicate with one or more RUs 440 via respective fronthaul links, and the RUs 440 may each communicate with respective UEs 120 via radio frequency (RF) access links. The DUs 430 and the RUs 440 may also be referred to as O-RAN DUs (O-DUs) 430 and O-RAN RUs (O-RUs) 440, respectively.

In some aspects, the DUs 430 and the RUs 440 may be implemented according to a functional split architecture in which functionality of a base station 110 (e.g., an eNB or a gNB) is provided by a DU 430 and one or more RUs 440 that communicate over a fronthaul link. Accordingly, as described herein, a base station 110 may include a DU 430 and one or more RUs 440 that may be co-located or geographically distributed. In some aspects, the DU 430 and the associated RU(s) 440 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 430 may correspond to a logical unit that includes one or more base station functions to control the operation of one or more RUs 440. For example, in some aspects, the DU 430 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 410. The RU(s) 440 controlled by a DU 430 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 440 handle all over the air (OTA) communication with a UE 120, and real-time and non-real-time aspects of control and user plane communication with the RU(s) 440 are controlled by the corresponding DU 430, which enables the DU(s) 430 and the CU 410 to be implemented in a cloud-based RAN architecture.

As indicated above, FIG. 4 is provided as an example. Other examples may differ from what is described with regard to FIG. 4.

FIG. 5 is a diagram illustrating an example 500 of a transport header for a message in an O-RAN, in accordance with the present disclosure. As shown in FIG. 5, the transport header may be included in a message transmitted between network nodes in an O-RAN architecture. For example, the transport header may be included in a message transmitted by a DU to an RU or in a message transmitted by an RU to a DU. The transport header may be included in control plane (C-plane) messages, user plane (U-plane) messages, and/or management plane (M-plane) messages. As shown in FIG. 5, the transport header may be an 8 byte transport header. In some aspects, the transport header may be an enhanced common public radio interface (eCPRI) transport header. In some aspects, the transport header may be included within a payload (e.g., an Ethernet payload) of a message.

The transport header may indicate information about a message, such as a message type, transmission source identifiers, destination identifiers, and/or sequence number identifiers. For example, the transport header may indicate eCPRI version information (e.g., an eCPRI protocol version) in an eCPRIVersion field of the transport header (e.g., in bit fields 0-3 of Octet 1). The transport header may include a concatenation indicator in an eCPRIConcatenation field (e.g., in bit field 7 of Octet 1). The concatenation indicator may indicate whether the message is associated with other messages in an eCPRI protocol data unit (PDU) (e.g., the concatenation indicator may indicate if a message is a last message in an eCPRI PDU or if another message follows the message within the eCPRI PDU). As shown in FIG. 5, bit fields 4-6 of Octet 1 of the transport header may be reserved (e.g., not used).

The transport header may include an eCPRIMessage field (e.g., in Octet 2) that indicates a message type associated with the message. For example, the eCPRIMessage field may indicate if a message is a C-plane message or a U-plane message. The transport header may include an eCPRI Payload field (e.g., in Octet 3 and/or Octet 4) that indicates a payload size (e.g., in bytes) of the message.

The transport header may include a field that indicates message source information and message destination information in Octet 5 and/or Octet 6. For example, if the message is a C-plane message, the message source information and the message destination information may be included in an eCPRIRtcid field. If the message is a U-plane message, the message source information and the message destination information may be included in an eCPRIPcid field. The message source information and the message destination information may be indicated by extended antenna-carrier (eAxC) information. For example, the eAxC information may include a transmitting device port identifier, a band sector identifier, a transmitting antenna identifier, a component carrier identifier, a receiving device port identifier, a receiving antenna identifier, an indication of a MIMO spatial steam, and/or an indication of a MIMO layer, among other examples. The message source information and the message destination information may indicate an eAxC identifier associated with the message. The transport header may include an eCPRISeqID field (e.g., in Octet 7 and/or Octet 8) that indicates a sequence identifier associated with the message.

As indicated above, FIG. 5 is provided as an example. Other examples may differ from what is described with regard to FIG. 5.

A DU may transmit C-plane messages to an RU via a fronthaul interface. In some examples, C-plane messages may be encapsulated using a two-layer header approach. A first layer may include an eCPRI header, which may include fields to indicate the message type. A second layer may be an application layer that includes fields for control and synchronization Within the application layer, a "section" defines characteristics of U-plane data to be transmitted or received by the RU using a beam with an associated pattern identifier. Various section types are defined for the sections in the application layer, and a structure of the C-plane message may be different for different section types. In some cases, section types (e.g., section type 0, section type 1, and/or section type 3, among other examples) in the O-RAN fronthaul interface standard are designed to provide information on a per eAxC (e.g., per spatial layer) and a per RB (or group of RBs) basis. Such section types may be well-suited for some information, such as digital beamforming information, that can change on a per RB or per spatial layer basis. However, some information, such as analog beamforming information, time domain duplex (TDD) configuration, and/or idle or guard periods, may apply to a group of carriers or band sectors. For example, such information may apply to all RBs and spatial layers in a group of carriers or band sectors. Repeating transmission of such information on a per RB and per spatial layer basis may utilize a large amount of C-plane signaling overhead, which may increase processing time for the RU and reduce network speed.

In some cases, it may be possible to enforce additional restrictions on an existing defined section type (e.g., a restriction that the number of RBs indicated in a section header associated with the section type is equal to 0) and enforce usage of one or more extensions (e.g., extension type 7) to transmit information that applies to all RBs and/or all eAxCs. However, in this case, the RU may not be able to determine, from a quick inspection, that a packet (e.g., C-plane message) includes the information that applied to all RBs and/or all eAxCs. Instead, the RU may be required to process every packet (e.g., every C-plane message) in a C-plane reception window in order to extract the relevant information. In this case, the RU may not be able to prioritize processing the information that applies to all RBs and/or all eAxCs early in the C-plane processing window, which may prevent any reduction of processing time for beamforming by the RU using the information.

Some techniques and apparatuses described herein enable a DU to transmit, to an RU, a C-plane message associated with a section type that is dedicated for information that applies to all RBs and spatial layers in a group of carriers or band sectors. The C-plane message may include information that applies to all RBs and spatial layers in an indicated group of carriers or band sectors. The RU may receive the C-plane message associated with a section type that is dedicated for information that applies to all RBs and spatial layers in a group of carriers or band sectors, and the RU may perform beamforming for one or more communications with a UE based at least in part on the information included in the C-plane message. As a result, the C-plane signaling overhead for providing the information to the RU may be reduced. Furthermore, the RU may prioritize C-plane messages associated with the section type that is dedicated for information that applies to all RBs and spatial layers in a group of carriers or band sectors, which may reduce processing time for the beamforming performed by the RU.

Beamforming is a technique in which an array of antenna elements is used to transmit radio signals in a specific beam direction or receive radio signals from a specific beam direction. In some examples, an RU may use hybrid beamforming, which combines analog beamforming and digital beamforming. In this case, a DU may specify analog beam information, along with digital beam information, on a per RB and per spatial layer basis. However, while digital beams may change on a per RB and per spatial layer basis, analog beams are wideband and apply to all RBs and all spatial layers for a carrier. Accordingly, the same analog beam information may be repeated numerous times with the digital beam information, leading to significant signaling overhead. Furthermore, in order for an RU to extract the analog beam information for a symbol, the RU may be required to process all of the digital beams within a carrier. For example, in some cases, there may be approximately 4000 digital beams per carrier.

Some techniques and apparatuses described herein enable a DU to transmit, to an RU, a C-plane message that includes analog beamforming information that applies to all RBs and spatial layers in one or more carriers. The RU may receive the C-plane message, and the RU may perform beamforming for one or more communications with a UE based at least in part on the analog beamforming information. In some aspects, the analog beamforming information may be included in an extension to a section header associated with a section type that is dedicated for information that applies to all RBs and spatial layers in a group of carriers or band sectors. As a result, the DU can provide the analog beam information for a symbol in a single message, thereby reducing C-plane signaling overhead and reducing processing time needed for the RU to process the analog beam information.

Figure 6:
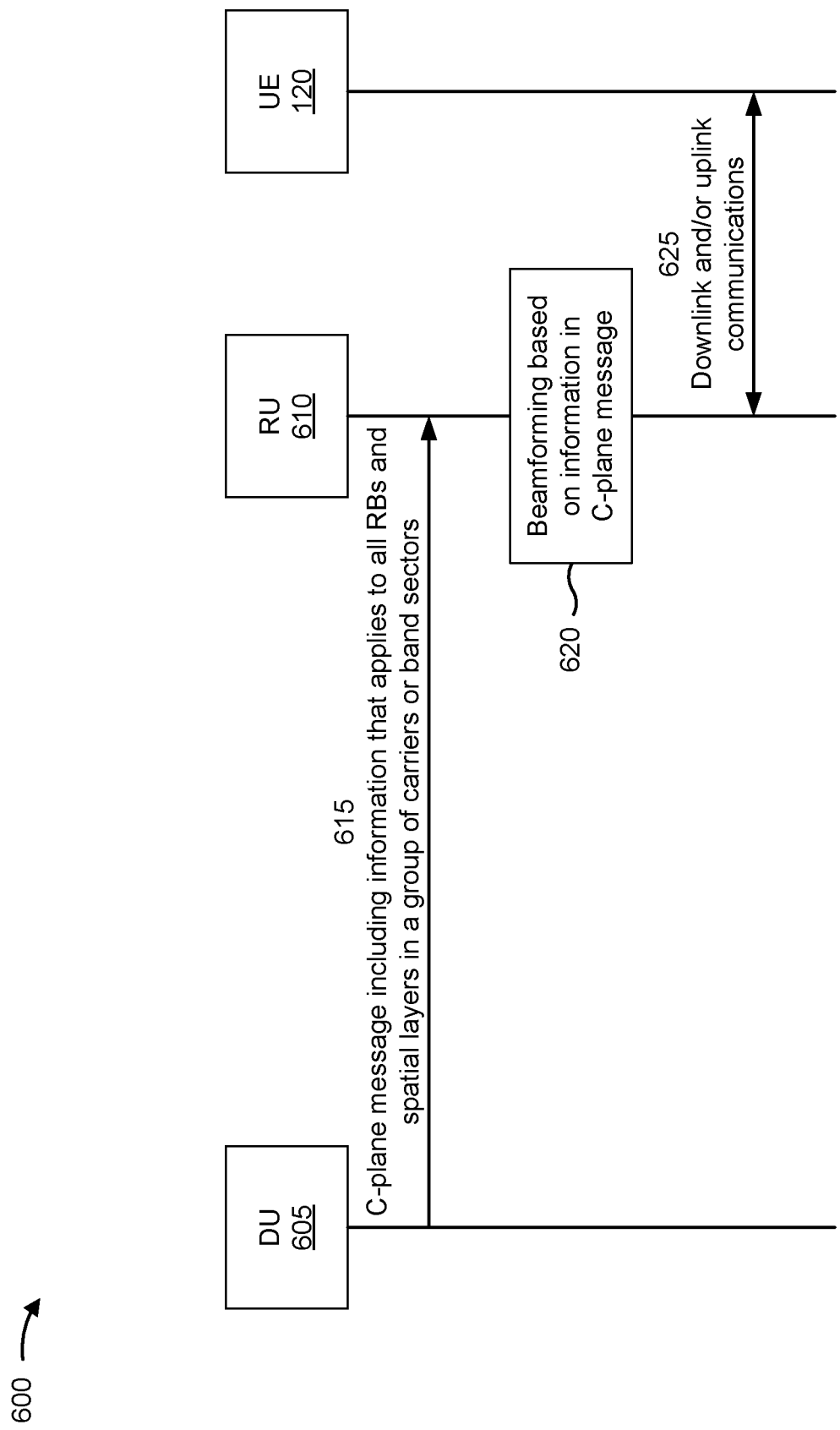

FIG. 6 is a diagram illustrating an example 600 associated with for a carrier configuration section type and an analog beamforming extension in an O-RAN, in accordance with the present disclosure. As shown in FIG. 6, example 600 includes communication between a DU 605, an RU 610, and a UE 120. In some aspects, the DU 605 and the RU 610 may be included in an O-RAN architecture. For example, the DU 605 may be similar to DU 430 described above in connection with FIG. 4, and the RU 610 may be similar to RU 440 described above in connection with FIG. 4. The DU 605 and the RU 610 may communicate via a fronthaul link (e.g., via a fronthaul interface). The RU 610 and the UE 120 may communicate via a wireless access link, which may include an uplink and a downlink.

As shown in FIG. 6, and by reference number 615, the DU 605 may transmit, to the RU 610, a C-plane message that includes information that applies to all RBs and spatial layers in a group of carriers (e.g., component carriers (CCs)) or band sectors. The RU 610 may receive the C-plane message transmitted by the DU 605. In some aspects, the C-plane message may be associated with a section type that is dedicated to information that applies to all RBs and spatial layers in a group of carriers or band sectors. In some aspects, the section type that is dedicated to information that applies to all RBs and spatial layers in a group of carriers or band sectors may be associated with an index used to identify messages associated with the section type. For example, this section type may be associated with an index of 8 (e.g., section type 8) or another index value. Hereinafter, the section type that is dedicated to information that applies to all RBs and spatial layers in a group of carriers or band sectors may be referred to as the "dedicated section type" or "section type 8."

By using the C-plane message associated with the dedicated section type, the DU 605 may send a single C-plane message that includes information (e.g., TDD configuration information, idle and/or active symbol information, and/or analog beamforming information, among other examples) that applies to all RBs and all spatial layers within a group of carriers or band sectors. In some aspects, the C-plane message associated with the dedicated section type may include a transport header, an application header, and one or more section headers associated with the dedicated section type. The transport header may be an eCPRI transport header, such as the eCPRI transport header described above in connection with FIG. 5. The application header may include an indication that the section type is the dedicated section type (e.g., section type 8). The application header may also indicate a number of sections for which information is included in the C-plane message. In some aspects, the C-plane message may include information for one or more sections of the dedicated section type, and each section may define characteristics of U-plane data to be transmitted or received using a respective beam direction. For example, different sections of the dedicated section type may be associated with different groups of carriers or band sectors and/or different groups of symbols (e.g., OFDM symbols) in a slot. In some aspects, the C-plane message may include a respective section header associated with the dedicated section type for each section. For example, the number of section headers included in the C-plane message may correspond to the number of sections indicated in the application layer. The section header associated with the dedicated section type may include the information that applies to all RBs and spatial layers for a group of carriers or band sectors.

In some aspects, the section header associated with the dedicated section type may indicate the group of carriers or band sectors to which the information in the section header applies. For example, the section header may include an eAxC mask that identifies (e.g., based at least in part on an eAxC identifier) the indicated group of carriers or band sectors to which the information in the section header applies. For example, the eAxC mask may indicate a set of eAxC identifiers, and the RU 610 may identify a group of band sectors from band sector identifiers associated with the eAxC identifiers or a group of component carriers from component carrier identifiers associated with the eAxC identifiers. In some aspects, the indicated group of carriers or band sectors may include one or more carriers or band sectors.

In some aspects, the section header associated with the dedicated section type may indicate the symbols in a slot for which the information in the section header applies. For example, the section header may include a symbol mask that identifies the symbols in a slot for which the RU 610 is to apply the information included in the section header (e.g., the symbols in the slot for which the RU 610 is to perform beamforming using the information included in the section header).

In some aspects, the section header associated with the dedicated section type may include a TDD configuration that applies to all RBs and spatial layers in the group of carriers or band sectors indicated in the section header. For example, the section header may include a direction pattern for the symbols in a slot (or a subset of the symbols in the slot indicated by the symbol mask) that provides the TDD configuration. In this case, the direction pattern may indicate a respective direction (e.g., downlink or uplink) associated with each symbol.

In some aspects, the section header associated with the dedicated section type may indicate idle and/or active information for symbols in a slot. For example, the section header may include an indication of a pattern of idle and active symbols for the symbols in a slot (or a subset of the symbols in the slot indicated by the symbol mask). In this case, the pattern of idle and active symbols may indicate, for each symbol, whether that symbol is idle or active.

In some aspects, the section header associated with the dedicated section type may not include an RB information. For example, the section header may not identify RBs, and the information included in the section header may be applied to all RBs in the indicated group of carriers or band sectors. In some aspects, the section header associated with the dedicated section type may allow extensions to include optional additional information that applies to all RBs and spatial layers in a group of carriers or band sectors. The C-plane message associated with the dedicated section type and the section header associated with the dedicated section type are depicted and described in more detail below in connection with FIG. 7.

In some aspects, the information included in the C-plane message may include analog beamforming information that applies to all RBs and spatial layers in a carrier or a group of carriers (or band sectors). In some aspects, the analog beamforming information may include an indication, for a carrier, of an analog beam that applies for all RBs and spatial layers in that carrier. In some aspects, the analog beamforming information may include a respective indication, for each carrier of one or more carriers (e.g., each carrier in a group of carriers or band sectors), of an analog beam that applies for all RBs and spatial layers in that carrier. For example, the indication of the analog beam for a carrier may be an analog beam to be used for hybrid beamforming for all RBs and spatial layers in that carrier. In some aspects, the indication of the analog beam for a carrier may identify a set of antenna element weights associated with the analog beam for the carrier. In some aspects, the indication of the analog beam for a carrier may include an indication of a beam identifier for the analog beam. In this case, the beam identifier for the analog beam may map to a set of antenna element weights associated with the analog beam for the carrier. For example, the RU 610 may determine the weights for the antenna elements for the analog beam for the carrier from a look-up table based at least in part on the indication of the beam identifier included in the analog beamforming information.

In some aspects, the analog beamforming information may be included in the C-plane message associated with the dedicated section type (e.g., the section type that is dedicated for information that applies to all RBs and spatial layers in a group of carriers or band sectors). For example, the analog beamforming information may be included in an analog beamforming extension included in the C-plane message associated with the dedicated section type. In some aspects, the analog beamforming extension may be included in the section header associated with the dedicated section type. For example, each section header associated with the dedicated section type may include a respective analog beamforming extension that indicates respective analog beams for the carriers in the group of carriers or band sectors indicated in the section header. In some aspects, the analog beamforming extension may be associated with an index used to identify the extension type. For example, the analog beamforming extension may be associated with an index of 21 (e.g., extension 21) or another index value. The analog beamforming extension, which may be included in the C-plane message associated with the dedicated section type, is depicted and described in more detail below in connection with FIG. 8.

As further shown in FIG. 6, and by reference number 620, the RU 610 may perform beamforming for one or more communications with the UE 120 based at least in part on the information included in the C-plane message received from the DU 605. For example, the RU 610 may perform beamforming using the information, included in the C-plane message, that applies to all RBs and spatial layers in a group of carriers or band sectors. In some aspects, the RU 610 may use the TDD configuration, the idle and active pattern, and/or the analog beamforming information included in the C-plane message in the beamforming to form transmit (Tx) beams for transmitting downlink communications to the UE 120 and/or receive (Rx) beams for receiving uplink communications from the UE 120 in the indicated symbols of a slot (e.g., in the symbol mask of the section header). For example, the RU 610 may use the TDD configuration, idle and active pattern, and/or analog beamforming information for an indicated a group of carriers or band sectors, in the beamforming for all of the RBs and spatial layers for the indicated group of carriers or band sectors.

In some aspects, the RU 610 may perform hybrid beamforming using the analog beamforming information indicated for a carrier (or group of carriers) for all RBs and spatial layers in that carrier (or group of carriers). In this case, the RU 610 may combine the analog beamforming information for the RBs and spatial layers in that carrier with digital beamforming information that is indicated (e.g., in other C-plane messages) on a per RB and per spatial layer basis.

In some aspects, the RU 610 may prioritize C-plane messages associated with the dedicated section type (e.g., as compared with C-plane messages associated with other section types). For example, the RU 610 may prioritize processing C-plane messages associated with the dedicated section type over other C-plane messages received in a C-plane reception window. This enables the RU 610 to determine the information that applies to all RBs and spatial layers, for different groups of carriers or band sectors early in the slot/symbol processing timeline, which may save processing time for the RU 610 to perform the beamforming.

In some aspects, the DU 605 other messages (e.g., other C-plane messages associated with other section types) to the RU 610 that include additional information related to beamforming. In this case, the RU 610 may perform beamforming based at least in part on the C-plane message associated with the dedicated section type and the information includes in one or more other messages (e.g., other C-plane messages) received from the DU 605.

As further shown in FIG. 6, and by reference number 625, the RU 610 may transmit one or more downlink communications to the UE 120 and/or receive one or more uplink communications from the UE 120 using beams resulting from the beamforming. For example, the RU 610 may transmit one or more downlink communications to the UE 120 using one or more Tx beams resulting from the beamforming. Additionally, or alternatively, the RU 610 may receive one or more uplink communications using one or more Rx beams resulting from the beamforming. The UE 120 may receive the one or more downlink communications from the RU 610 and/or transmit the one or more uplink communications to the RU 610 using Rx and/or Tx beams corresponding to the Tx and/or Rx beams used by the RU 610.

As described above, the DU 605 may transmit, to the RU 610, a C-plane message associated with a section type that is dedicated for information that applies to all RBs and spatial layers in a group of carriers or band sectors. The C-plane message may include information that applies to all RBs and spatial layers in an indicated group of carriers or band sectors. The RU 610 may receive the C-plane message associated with the dedicated section type, and the RU 610 may perform beamforming for one or more communications with a UE 120 based at least in part on the information included in the C-plane message. As a result, the C-plane signaling overhead for providing the information to the RU 610 may be reduced. For example, without the dedicated section type described herein, the RU 610 may need to process hundreds of section 1 C-plane messages to determine the TDD configuration for all band sectors, but with the dedicated section type described herein, the RU 610 may determine the TDD configuration for all band sectors from only a few C-plane messages associated with the dedicated section type. Furthermore, the RU 610 may prioritize C-plane messages associated with the dedicated section type, which may reduce processing time for the beamforming performed by the RU 610.

As described above, the C-plane message may include analog beamforming information that applies to all RBs and spatial layers in one or more carriers. In some aspects, the analog beamforming information may be included in an extension to a section header associated with the dedicated section type. As a result, C-plane signaling overhead may be reduced. For example, without the analog beamforming extension described herein, the RU 610 may need to process all 4000 digital beams to extract a single analog beam for a symbol within a carrier, but with the analog beamforming extension, the RU 610 may determine the analog beam for a symbol in a carrier from a single C-plane message. This may save processing time needed for the RU to process the analog beam information. In some examples, without the dedicated section type and the analog beamforming extension, an RF switcher (RFSW) of the RU 610 may have approximately 20 µs to process analog beam information, but with the dedicated section and the analog beamforming extension, the RFSW of the RU 610 may have approximately 120 µs to process analog beam information.

As indicated above, FIG. 6 is provided as an example. Other examples may differ from what is described with respect to FIG. 6.

Figure 7:
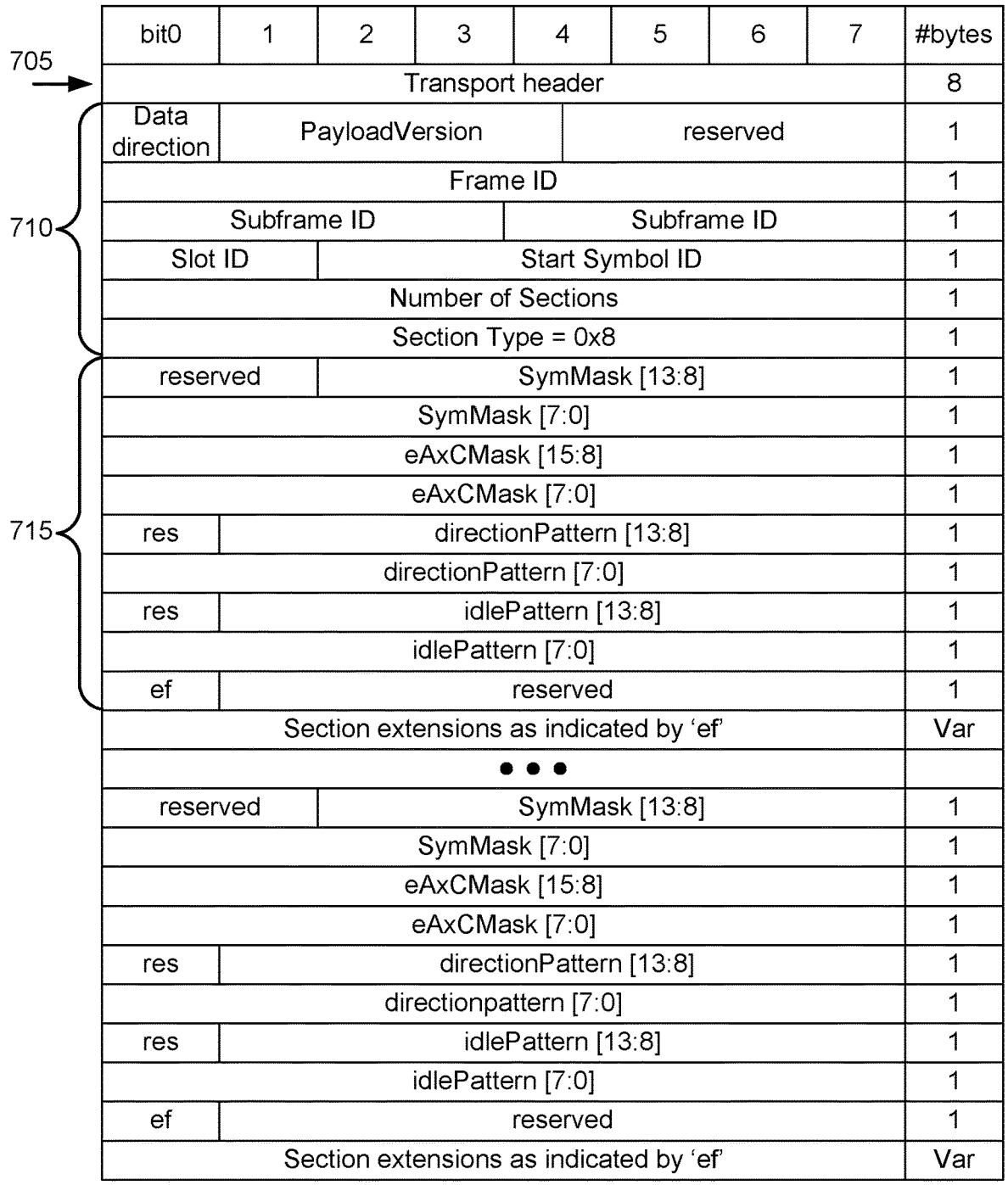

FIG. 7 is a diagram illustrating an example 700 associated with a carrier configuration section type and an analog beamforming extension in an O-RAN, in accordance with the present disclosure. As shown in FIG. 7, example 700 shows an example of a structure of a C-plane message associated with a section type that is dedicated for information that applies to all RBs and spatial layers in a group of carriers or band sectors (e.g., the "dedicated section type" or "section type 8").

As shown in FIG. 7, the C-plane message associated with the dedicated section type may include a transport header 705, an application header 710, and one or more section headers 715 associated with the dedicated section type. In some aspects, the transport header 705 may be an eCPRI transport header, such as the eCPRI transport header described above in connection with FIG. 5. The application header 710 may include a field that indicates the section type for the C-plane message. For example, the section type field may indicate that the section type is the dedicated section type (e.g., section type 8). The application header 710 may also include a field that indicates a number of sections for which information is included in the C-plane message. For example, different sections of the dedicated section type may be associated with different groups of carriers or band sectors and/or different groups of symbols (e.g., OFDM symbols) in a slot. In some aspects, the C-plane message may include a respective section header 715 for each section. For example, the number of section headers 715 included in the C-plane message may correspond to the number of sections indicated in the application header 710. The application header 710 may also include fields that indicate a data direction, a payload version, a frame ID, subframe IDs, a slot ID, and a starting symbol ID.

As shown in FIG. 7, the section header 715 associated with the dedicated section type may indicate the group of carriers or band sectors to which the information in the section header applies. For example, the section header 715 may include an eAxC mask field (eAxCMask) that identifies (e.g., using an eAxC identifier) the indicated group of carriers or band sectors to which the information in the section header 715 applies. For example, the eAxC mask field may include 16 bits (e.g., eAxCMask [7:0] and eAxCMask [15:8]) for indicating eAxC identifiers that identify the group of band sectors or carriers to which the information in the section header 715 applies.

As further shown in FIG. 7, the section header 715 may include a symbol mask field (SymMask) that identifies the symbols in a slot for which the information included in the section header applies. For example, the symbol mask field may include 14 bits (e.g., SymMask [7:0] and SymMask [13:8]), and each bit may provide the indication for a respective symbol in a slot.

As further shown in FIG. 7, the section header 715 may indicate a TDD configuration that applies to all RBs and spatial layers in the group of carriers or band sectors indicated in the section header 715. For example, the section header 715 may include a direction pattern field (directionPattern) that indicates the TDD configuration for the symbols in a slot (or a subset of the symbols in the slot indicated by the symbol mask). In this case, the direction pattern field may include 14 bits (e.g., directionPattern [7:0] and directionPattern [13:8]) that indicate respective directions (e.g., downlink or uplink) for the symbols in a slot.

As further shown in FIG. 7, the section header 715 may indicate idle and/or active information for symbols in a slot. For example, the section header 715 may include an idle pattern field (idlePattern) that indicates of a pattern of idle and active symbols for the symbols in a slot (or a subset of the symbols in the slot indicated by the symbol mask). In this case, the idle pattern field may include 14 bits (e.g., idlePattern [7:0] and idlePattern [13:8]) that provide respective indications of idle or active for the symbols in the slot.

In some aspects, the section header 715 associated with the dedicated section type may not include an RB information. For example, the section header may not identify RBs, and the information included in the section header may be applied to all RBs in the indicated group of carriers or band sectors. In some aspects, the section header 715 associated with the dedicated section type may allow extensions to include optional additional information that apply to all RBs and spatial layers in a group of carriers or band sectors.

As indicated above, FIG. 7 is provided as an example. Other examples may differ from what is described with respect to FIG. 7.

FIG. 8 is a diagram illustrating an example 800 associated with a carrier configuration section type and an analog beamforming extension in an O-RAN, in accordance with the present disclosure. As shown in FIG. 8, example 800 shows an example of a structure of an analog beamforming extension for a C-plane message that is associated with a section type that is dedicated for information that applies to all RBs and spatial layers in a group of carriers or band sectors. In some aspects, the analog beamforming extension may be an extension included in a section header (e.g., section header 715) associated with the dedicated section type.

As shown in FIG. 8, the analog beamforming extension may indicate an extension type (e.g., in an extType field) and an extension length (e.g., in an extLen field). As further shown in FIG. 8, the analog beamforming extension may further include one or more analog beam indication fields (e.g., analogBeam0-analogBeamN) that provide indications of respective analog beams for one or more carriers (e.g., carrier0-carrierN). For example, the analog beamforming extension may include a respective indication of an analog beam for each carrier in a group of carriers or band sectors indicated a section header (e.g., section header 715) associated with the dedicated section type. As shown in FIG. 8, the analog beam indication field (e.g., analogBeam0) may include 16 bits (e.g., analogBeam0[7:0] and analogBeam0 [15:8]) for providing the indication of the analog beam for a carrier. In some aspects, the indication of the analog beam for a carrier may identify a set of antenna element weights associated with the analog beam for the carrier. In some aspects, the indication of the analog beam for a carrier may include an indication of a beam identifier for the analog beam. In this case, the beam identifier for the analog beam may map to a set of antenna element weights associated with the analog beam for the carrier.

As indicated above, FIG. 8 is provided as an example. Other examples may differ from what is described with respect to FIG. 8.

Figure 9:
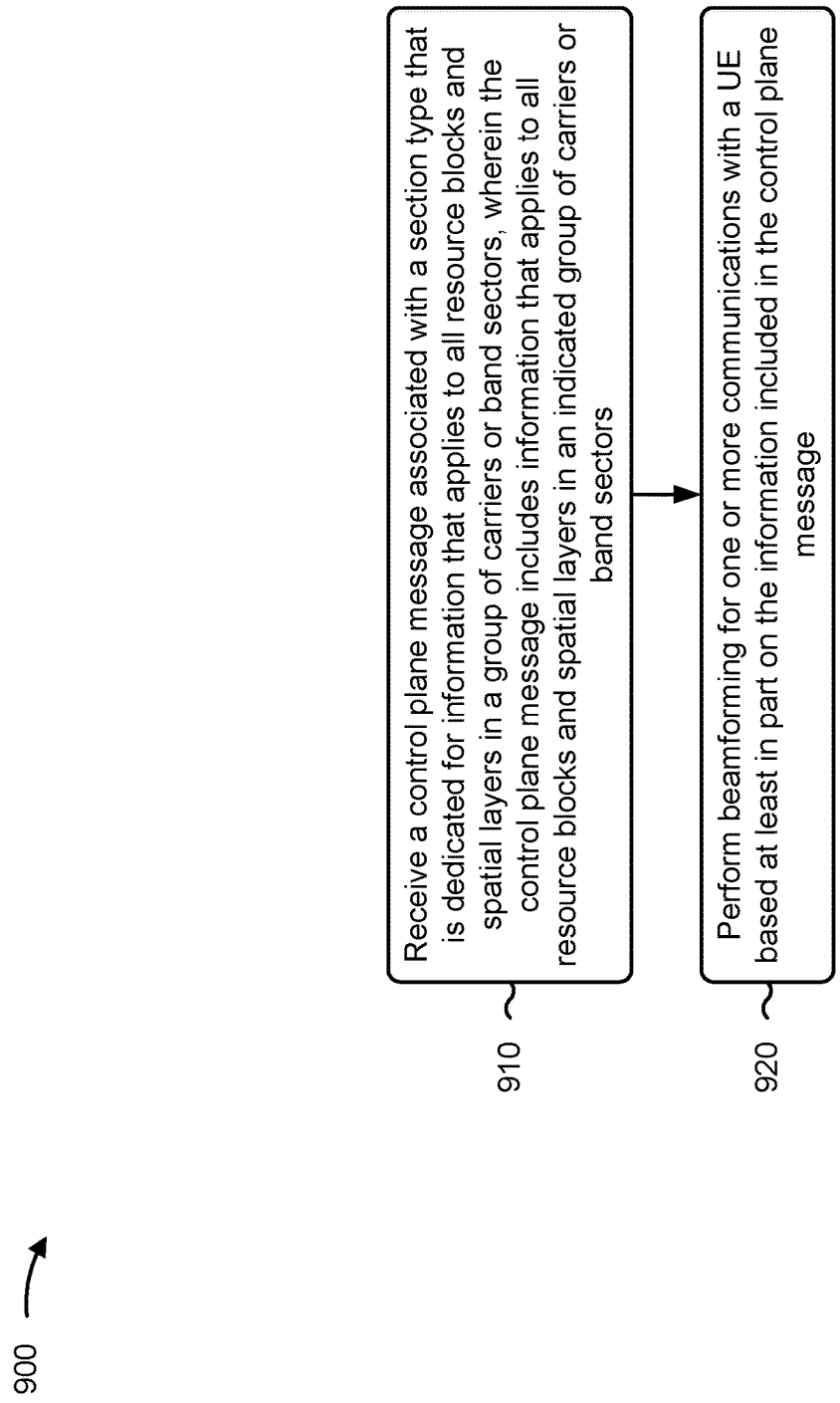
FIGS. 9-12 are diagrams illustrating example processes associated with a carrier configuration section type and an analog beamforming extension in an O-RAN, in accordance with the present disclosure.

FIG. 9 is a diagram illustrating an example process 900 performed, for example, by an RU, in accordance with the present disclosure. Example process 900 is an example where the RU (e.g., RU 610) performs operations associated with a carrier configuration section type and an analog beamforming extension in an O-RAN.

As shown in FIG. 9, in some aspects, process 900 may include receiving, from a DU, a control plane message associated with a section type that is dedicated for information that applies to all resource blocks and spatial layers in a group of carriers or band sectors, wherein the control plane message includes information that applies to all resource blocks and spatial layers in an indicated group of carriers or band sectors (block 910). For example, the RU (e.g., using reception component 1302, depicted in FIG. 13) may receive, from a DU, a control plane message associated with a section type that is dedicated for information that applies to all resource blocks and spatial layers in a group of carriers or band sectors, wherein the control plane message includes information that applies to all resource blocks and spatial layers in an indicated group of carriers or band sectors, as described above in connection with FIGS. 6-8.

As further shown in FIG. 9, in some aspects, process 900 may include performing beamforming for one or more communications with a UE based at least in part on the information included in the control plane message (block 920). For example, the RU (e.g., using beamforming component 1308, depicted in FIG. 13) may perform beamforming for one or more communications with a UE based at least in part on the information included in the control plane message, as described above in connection with FIGS. 6-8.

Process 900 may include additional aspects, such as any single aspect or any combination of aspects described below and/or in connection with one or more other processes described elsewhere herein.

In a first aspect, the control plane message includes an indication of the section type that is dedicated for information that applies to all resource blocks and spatial layers in a group of carriers or band sectors, and a section header associated with the section type, wherein the section header includes the information that applies to all resource blocks and spatial layers in the indicated group of carriers or band sectors.

In a second aspect, alone or in combination with the first aspect, the section header includes an indication of an eAxC mask that identifies the indicated group of carriers or band sectors to which the information included in the section header applies.

In a third aspect, alone or in combination with one or more of the first and second aspects, the information included in the section header includes a TDD configuration that applies to all resource blocks and spatial layers in the indicated group of carriers or band sectors.

In a fourth aspect, alone or in combination with one or more of the first through third aspects, the information included in the section header includes a pattern of idle and active symbols that applies to all resource blocks and spatial layers in the indicated group of carriers or band sectors.

In a fifth aspect, alone or in combination with one or more of the first through fourth aspects, the section header includes an indication of symbols, in a slot, for which the information included in the section header applies.

In a sixth aspect, alone or in combination with one or more of the first through fifth aspects, the information included in the control plane message includes analog beamforming information for the indicated group of carriers or band sectors.

In a seventh aspect, alone or in combination with one or more of the first through sixth aspects, the control plane message includes a section header associated with the section type that is dedicated for information that applies to all resource blocks and spatial layers in a group of carriers or band sectors, and the analog beamforming information is included in an analog beamforming extension in the section header.

In an eighth aspect, alone or in combination with one or more of the first through seventh aspects, the analog beamforming information includes, for each carrier of the indicated group of carriers or band sectors, an indication of a respective analog beam that applies for all resource blocks and spatial layers in that carrier.

In a ninth aspect, alone or in combination with one or more of the first through eighth aspects, the indication of the respective analog beam, for each carrier of the indicated group of carriers or band sectors, includes an indication of a beam identifier for the respective analog beam, and the beam identifier for the respective analog beam maps to a set of antenna element weights for the respective analog beam.

In a tenth aspect, alone or in combination with one or more of the first through ninth aspects, process 900 includes communicating with the UE using one or more beams resulting from the beamforming.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
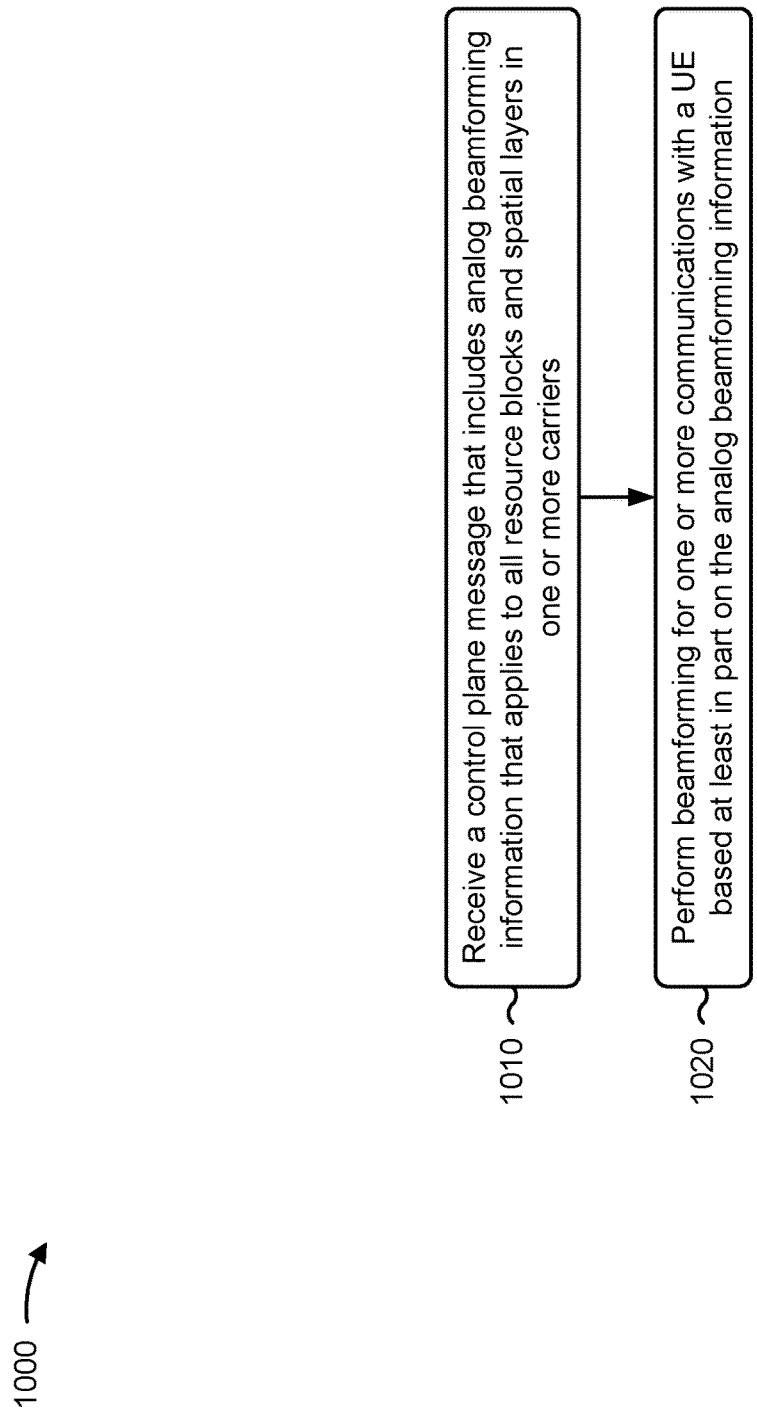

FIG. 10 is a diagram illustrating an example process 1000 performed, for example, by an RU, in accordance with the present disclosure. Example process 1000 is an example where the RU (e.g., RU 610) performs operations associated with a carrier configuration section type and an analog beamforming extension in an O-RAN.

As shown in FIG. 10, in some aspects, process 1000 may include receiving, from a DU, a control plane message that includes analog beamforming information that applies to all resource blocks and spatial layers in one or more carriers (block 1010). For example, the RU (e.g., using reception component 1302, depicted in FIG. 13) may receive, from a DU, a control plane message that includes analog beamforming information that applies to all resource blocks and spatial layers in one or more carriers, as described above in connection with FIGS. 6-8.

As further shown in FIG. 10, in some aspects, process 1000 may include performing beamforming for one or more communications with a UE based at least in part on the analog beamforming information (block 1020). For example, the RU (e.g., using beamforming component 1308, depicted in FIG. 13) may perform beamforming for one or more communications with a UE based at least in part on the analog beamforming information, as described above in connection with FIGS. 6-8.

Process 1000 may include additional aspects, such as any single aspect or any combination of aspects described below and/or in connection with one or more other processes described elsewhere herein.

In a first aspect, the analog beamforming information includes, for each carrier of the one or more carriers, an indication of a respective analog beam that applies for all resource blocks and spatial layers in that carrier.

In a second aspect, alone or in combination with the first aspect, the indication of the respective analog beam, for each carrier of the one or more carriers, includes an indication of a beam identifier for the respective analog beam, and the beam identifier for the respective analog beam maps to a set of antenna element weights for the respective analog beam.

In a third aspect, alone or in combination with one or more of the first and second aspects, the control plane message is associated with a section type that is dedicated for information that applies to all resource blocks and spatial layers in a group of carriers or band sectors.

In a fourth aspect, alone or in combination with one or more of the first through third aspects, the control plane message includes a section header associated with the section type that is dedicated for information that applies to all resource blocks and spatial layers in a group of carriers or band sectors, and the analog beamforming information is included in an analog beamforming extension in the section header.

In a fifth aspect, alone or in combination with one or more of the first through fourth aspects, process 1000 includes communicating with the UE using one or more beams resulting from the beamforming.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
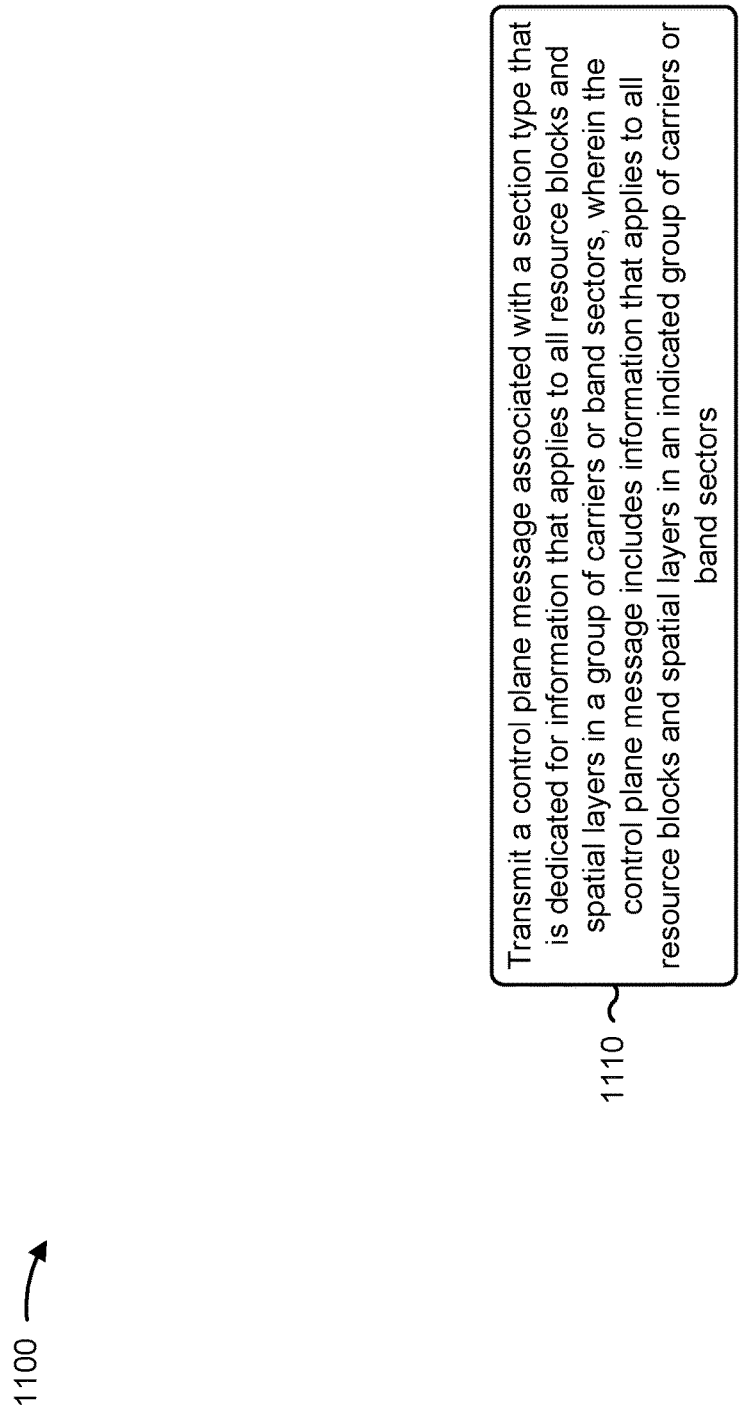

FIG. 11 is a diagram illustrating an example process 1100 performed, for example, by a DU, in accordance with the present disclosure. Example process 1100 is an example where the DU (e.g., DU 605) performs operations associated with a carrier configuration section type and an analog beamforming extension in an O-RAN.

As shown in FIG. 11, in some aspects, process 1100 may include transmitting, to an RU, a control plane message associated with a section type that is dedicated for information that applies to all resource blocks and spatial layers in a group of carriers or band sectors, wherein the control plane message includes information that applies to all resource blocks and spatial layers in an indicated group of carriers or band sectors (block 1110). For example, the DU (e.g., using transmission component 1404, depicted in FIG. 4) may transmit, to an RU, a control plane message associated with a section type that is dedicated for information that applies to all resource blocks and spatial layers in a group of carriers or band sectors, wherein the control plane message includes information that applies to all resource blocks and spatial layers in an indicated group of carriers or band sectors, as described above in connection with FIGS. 6-8.

Process 1100 may include additional aspects, such as any single aspect or any combination of aspects described below and/or in connection with one or more other processes described elsewhere herein.

In a first aspect, the control plane message includes an indication of the section type that is dedicated for information that applies to all resource blocks and spatial layers in a group of carriers or band sectors, and a section header associated with the section type, wherein the section header includes the information that applies to all resource blocks and spatial layers in the indicated group of carriers or band sectors.

In a second aspect, alone or in combination with the first aspect, the section header includes an indication of an eAxC mask that identifies the indicated group of carriers or band sectors to which the information included in the section header applies.

In a third aspect, alone or in combination with one or more of the first and second aspects, the information included in the section header includes a TDD configuration that applies to all resource blocks and spatial layers in the indicated group of carriers or band sectors.

In a fourth aspect, alone or in combination with one or more of the first through third aspects, the information included in the section header includes a pattern of idle and active symbols that applies to all resource blocks and spatial layers in the indicated group of carriers or band sectors.

In a fifth aspect, alone or in combination with one or more of the first through fourth aspects, the section header includes an indication of symbols, in a slot, for which the information included in the section header applies.

In a sixth aspect, alone or in combination with one or more of the first through fifth aspects, the information included in the control plane message includes analog beamforming information for the indicated group of carriers or band sectors.

In a seventh aspect, alone or in combination with one or more of the first through sixth aspects, the control plane message includes a section header associated with the section type that is dedicated for information that applies to all resource blocks and spatial layers in a group of carriers or band sectors, and the analog beamforming information is included in an analog beamforming extension in the section header.

In an eighth aspect, alone or in combination with one or more of the first through seventh aspects, the analog beamforming information includes, for each carrier of the indicated group of carriers or band sectors, an indication of a respective analog beam that applies for all resource blocks and spatial layers in that carrier.

In a ninth aspect, alone or in combination with one or more of the first through eighth aspects, the indication of the respective analog beam, for each carrier of the indicated group of carriers or band sectors, includes an indication of a beam identifier for the respective analog beam, and the beam identifier for the respective analog beam maps to a set of antenna element weights for the respective analog beam.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
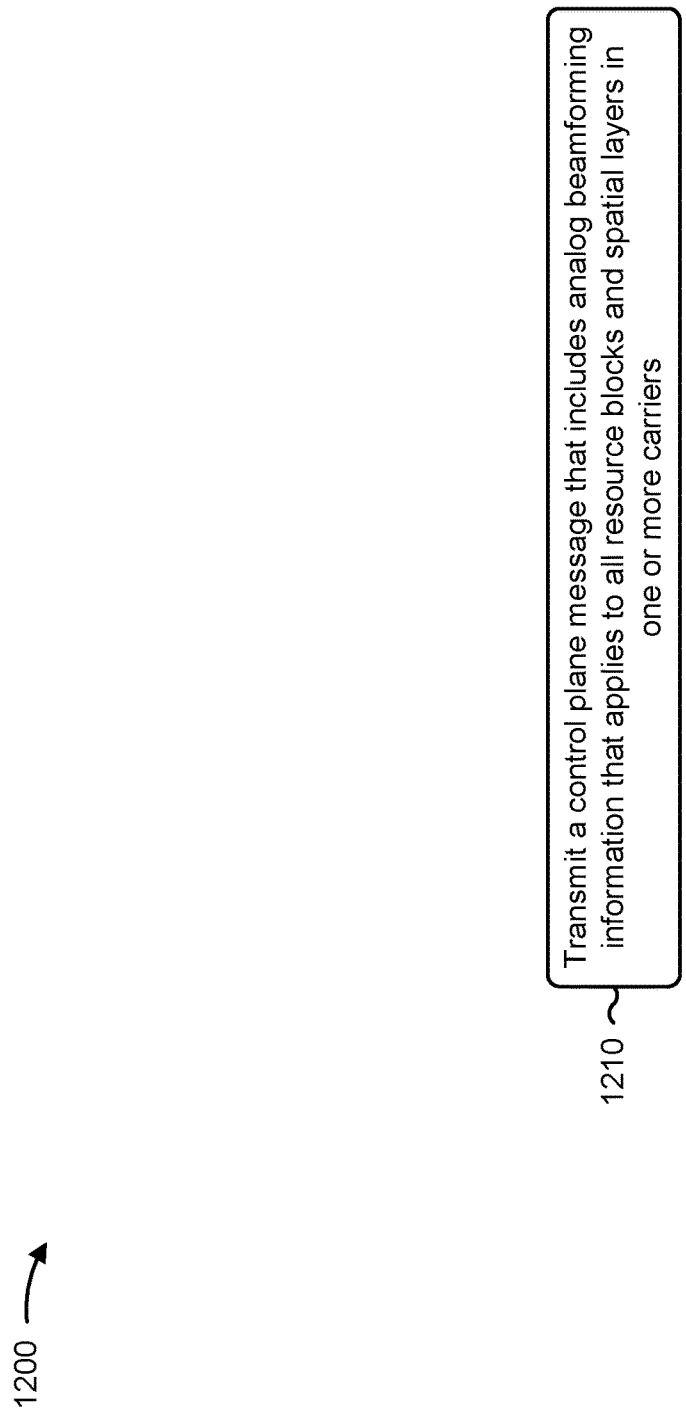

FIG. 12 is a diagram illustrating an example process 1200 performed, for example, by a DU, in accordance with the present disclosure. Example process 1200 is an example where the DU (e.g., DU 605) performs operations associated with a carrier configuration section type and an analog beamforming extension in an O-RAN.

As shown in FIG. 12, in some aspects, process 1200 may include transmitting, to an RU, a control plane message that includes analog beamforming information that applies to all resource blocks and spatial layers in one or more carriers (block 1210). For example, the DU (e.g., using transmission component 1404, depicted in FIG. 14) may transmit, to an RU, a control plane message that includes analog beamforming information that applies to all resource blocks and spatial layers in one or more carriers, as described above in connection with FIGS. 6-8.

Process 1200 may include additional aspects, such as any single aspect or any combination of aspects described below and/or in connection with one or more other processes described elsewhere herein.

In a first aspect, the analog beamforming information includes, for each carrier of the one or more carriers, an indication of a respective analog beam that applies for all resource blocks and spatial layers in that carrier.

In a second aspect, the indication of the respective analog beam, for each carrier of the one or more carriers, includes an indication of a beam identifier for the respective analog beam, and the beam identifier for the respective analog beam maps to a set of antenna element weights for the respective analog beam.

In a third aspect, the control plane message is associated with a section type that is dedicated for information that applies to all resource blocks and spatial layers in a group of carriers or band sectors.

In a fourth aspect, the control plane message includes a section header associated with the section type that is dedicated for information that applies to all resource blocks and spatial layers in a group of carriers or band sectors, and the analog beamforming information is included in an analog beamforming extension in the section header.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
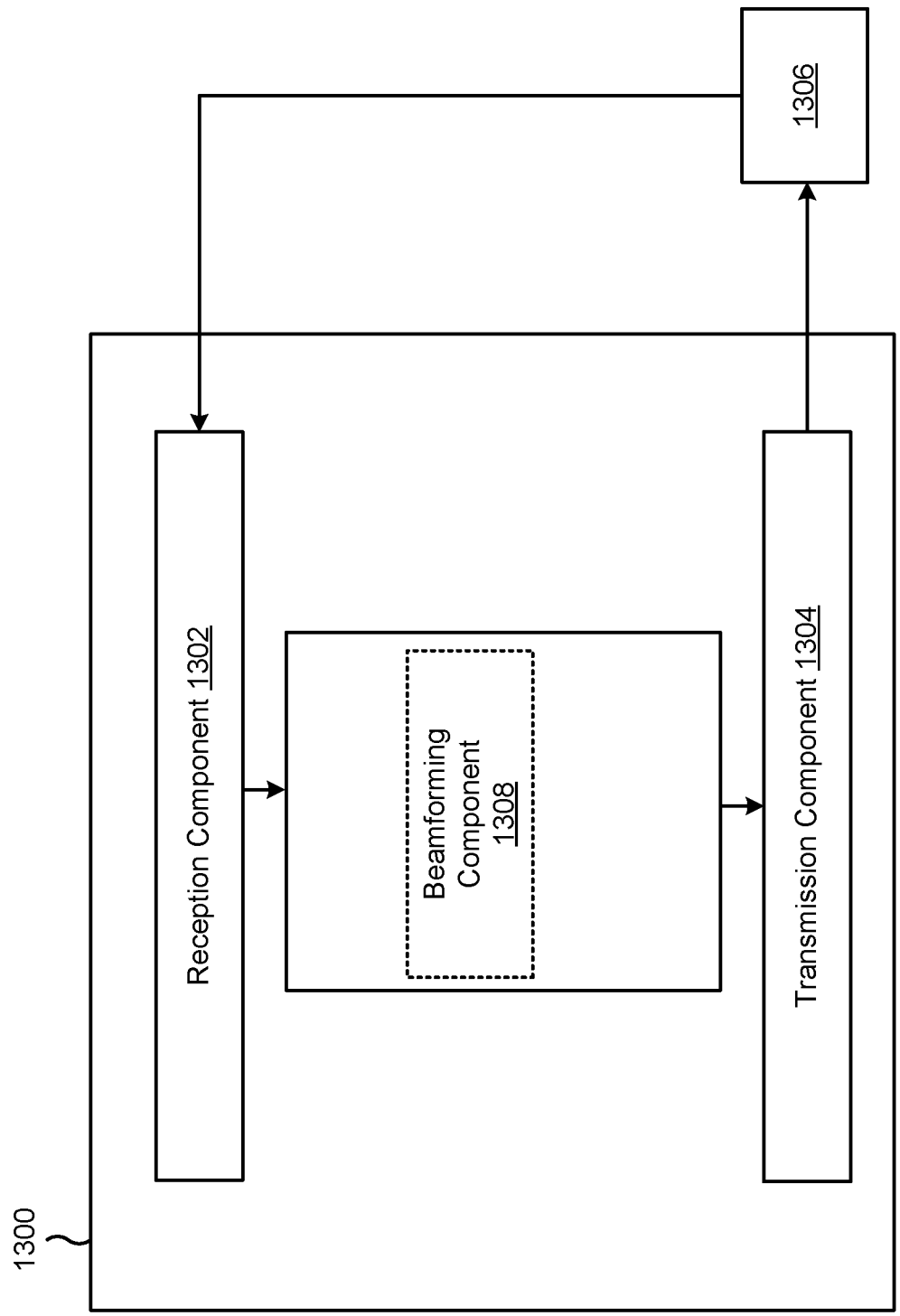
FIGS. 13-14 are diagrams of example apparatuses for wireless communication, in accordance with the present disclosure.

FIG. 13 is a diagram of an example apparatus 1300 for wireless communication. The apparatus 1300 may be a RU, or a RU may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a DU, or another wireless communication device) using the reception component 1302 and the transmission component 1304. As further shown, the apparatus 1300 may include a beamforming component 1308, among other examples.

In some aspects, the apparatus 1300 may be configured to perform one or more operations described herein in connection with FIGS. 6-8. Additionally, or alternatively, the apparatus 1300 may be configured to perform one or more processes described herein, such as process 900 of FIG. 9, process 1000 of FIG. 10, or a combination thereof. In some aspects, the apparatus 1300 and/or one or more components shown in FIG. 13 may include one or more components of the RU described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the RU described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the RU described in connection with FIG. 2. In some aspects, the transmission component 1304 may be co-located with the reception component 1302 in a transceiver.

The reception component 1302 may receive, from a DU, a control plane message associated with a section type that is dedicated for information that applies to all resource blocks and spatial layers in a group of carriers or band sectors, wherein the control plane message includes information that applies to all resource blocks and spatial layers in an indicated group of carriers or band sectors. The beamforming component 1308 may perform beamforming for one or more communications with a UE based at least in part on the information included in the control plane message.

The reception component 1302 and/or the transmission component 1304 may communicate with the UE using one or more beams resulting from the beamforming.

The reception component 1302 may receive, from a DU, a control plane message that includes analog beamforming information that applies to all resource blocks and spatial layers in one or more carriers. The beamforming component 1308 may perform beamforming for one or more communications with a UE based at least in part on the analog beamforming information.

The reception component 1302 and/or the transmission component 1304 may communicate with the UE using one or more beams resulting from the beamforming.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
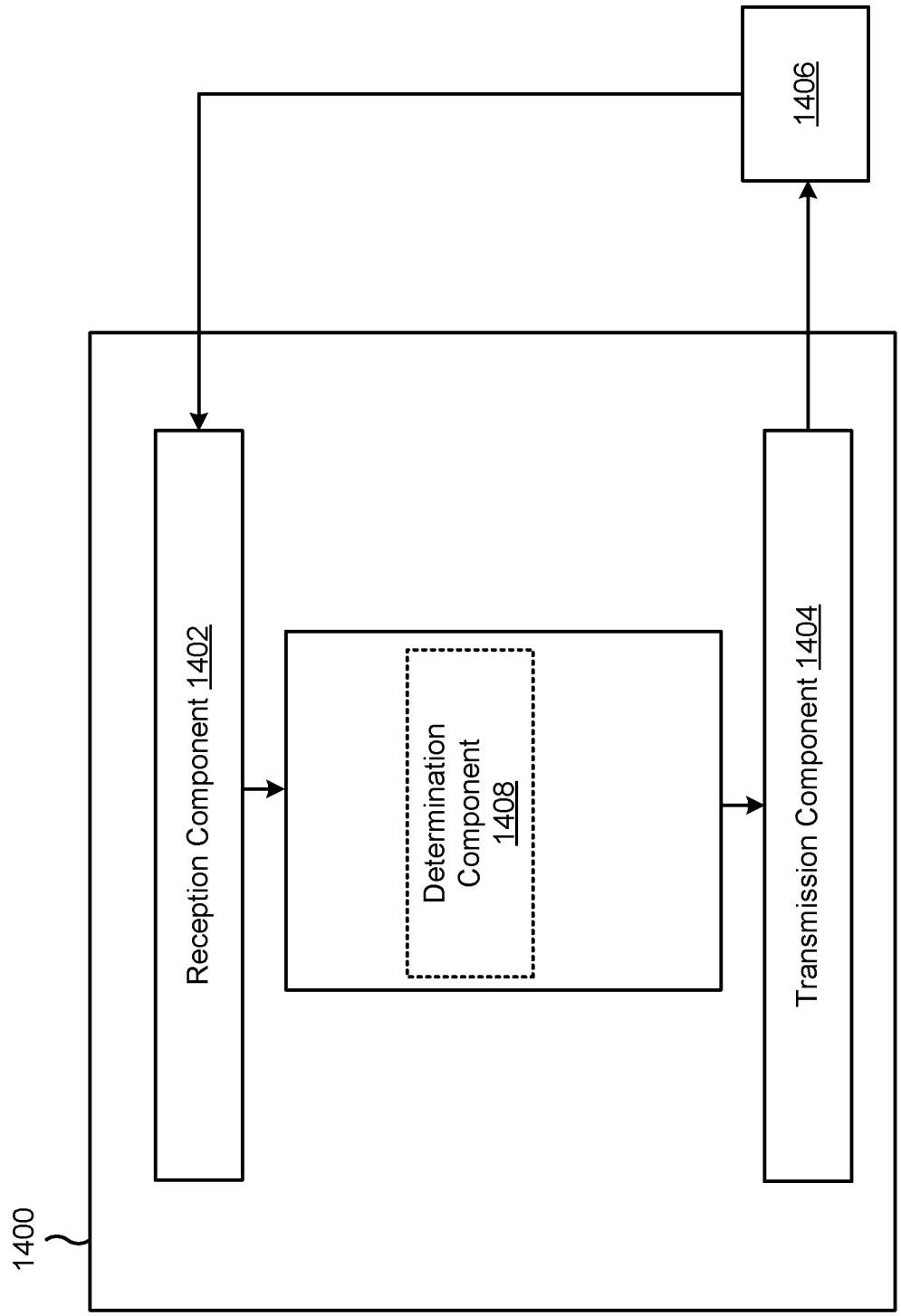

FIG. 14 is a diagram of an example apparatus 1400 for wireless communication. The apparatus 1400 may be a DU, or a DU may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as an RU or another wireless communication device) using the reception component 1402 and the transmission component 1404. As further shown, the apparatus 1400 may a determination component 1408.

In some aspects, the apparatus 1400 may be configured to perform one or more operations described herein in connection with FIGS. 6-8. Additionally, or alternatively, the apparatus 1400 may be configured to perform one or more processes described herein, such as process 1100 of FIG. 11, process 1200 of FIG. 12, or a combination thereof. In some aspects, the apparatus 1400 and/or one or more components shown in FIG. 14 may include one or more components of the DU described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the DU described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the DU described in connection with FIG. 2. In some aspects, the transmission component 1404 may be co-located with the reception component 1402 in a transceiver.

The transmission component 1404 may transmit, to an RU, a control plane message associated with a section type that is dedicated for information that applies to all resource blocks and spatial layers in a group of carriers or band sectors, wherein the control plane message includes information that applies to all resource blocks and spatial layers in an indicated group of carriers or band sectors.

The determination component 1408 may determine the information that applies to all resource blocks and spatial layers in the indicated group of carriers or band sectors.

The transmission component 1404 may transmit, to an RU, a control plane message that includes analog beamforming information that applies to all resource blocks and spatial layers in one or more carriers.

The determination component 1408 may determine the analog beamforming information.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a radio unit (RU), comprising: receiving, from a distributed unit (DU), a control plane message associated with a section type that is dedicated for information that applies to all resource blocks and spatial layers in a group of carriers or band sectors, wherein the control plane message includes information that applies to all resource blocks and spatial layers in an indicated group of carriers or band sectors; and performing beamforming for one or more communications with a user equipment (UE) based at least in part on the information included in the control plane message.

Aspect 2: The method of Aspect 1, wherein the control plane message includes an indication of the section type that is dedicated for information that applies to all resource blocks and spatial layers in a group of carriers or band sectors, and a section header associated with the section type, wherein the section header includes the information that applies to all resource blocks and spatial layers in the indicated group of carriers or band sectors.

Aspect 3: The method of Aspect 2, wherein the section header includes an indication of an extended antenna-carrier (eAxC) mask that identifies the indicated group of carriers or band sectors to which the information included in the section header applies.

Aspect 4: The method of any of Aspects 2-3, wherein the information included in the section header includes a time domain duplex (TDD) configuration that applies to all resource blocks and spatial layers in the indicated group of carriers or band sectors.

Aspect 5: The method of any of Aspects 2-4, wherein the information included in the section header includes a pattern of idle and active symbols that applies to all resource blocks and spatial layers in the indicated group of carriers or band sectors.

Aspect 6: The method of any of Aspects 2-5, wherein the section header includes an indication of symbols, in a slot, for which the information included in the section header applies.

Aspect 7: The method of any of Aspects 1-6, wherein the information included in the control plane message includes analog beamforming information for the indicated group of carriers or band sectors.

Aspect 8: The method of Aspect 7, wherein the control plane message includes a section header associated with the section type that is dedicated for information that applies to all resource blocks and spatial layers in a group of carriers or band sectors, and wherein the analog beamforming information is included in an analog beamforming extension in the section header.

Aspect 9: The method of any of Aspects 7-8, wherein the analog beamforming information includes, for each carrier of the indicated group of carriers or band sectors, an indication of a respective analog beam that applies for all resource blocks and spatial layers in that carrier.

Aspect 10: The method of Aspect 9, wherein the indication of the respective analog beam, for each carrier of the indicated group of carriers or band sectors, includes an indication of a beam identifier for the respective analog beam, and wherein the beam identifier for the respective analog beam maps to a set of antenna element weights for the respective analog beam.

Aspect 11: The method of any of Aspects 1-10, further comprising: communicating with the UE using one or more beams resulting from the beamforming.

Aspect 12: A method of wireless communication performed by a radio unit (RU), comprising: receiving, from a distributed unit (DU), a control plane message that includes analog beamforming information that applies to all resource blocks and spatial layers in one or more carriers; and performing beamforming for one or more communications with a user equipment (UE) based at least in part on the analog beamforming information.

Aspect 13: The method of Aspect 12, wherein the analog beamforming information includes, for each carrier of the one or more carriers, an indication of a respective analog beam that applies for all resource blocks and spatial layers in that carrier.

Aspect 14: The method of Aspect 13, wherein the indication of the respective analog beam, for each carrier of the one or more carriers, includes an indication of a beam identifier for the respective analog beam, and wherein the beam identifier for the respective analog beam maps to a set of antenna element weights for the respective analog beam.

Aspect 15: The method of any of Aspects 12-14, wherein the control plane message is associated with a section type that is dedicated for information that applies to all resource blocks and spatial layers in a group of carriers or band sectors.

Aspect 16: The method of any of Aspects 12-15, wherein the control plane message includes a section header associated with a section type that is dedicated for information that applies to all resource blocks and spatial layers in a group of carriers or band sectors, and wherein the analog beamforming information is included in an analog beamforming extension in the section header.

Aspect 17: The method of any of Aspects 12-16, further comprising: communicating with the UE using one or more beams resulting from the beamforming.

Aspect 18: A method of wireless communication performed by a distributed unit (DU), comprising: transmitting, to a radio unit (RU), a control plane message associated with a section type that is dedicated for information that applies to all resource blocks and spatial layers in a group of carriers or band sectors, wherein the control plane message includes information that applies to all resource blocks and spatial layers in an indicated group of carriers or band sectors.

Aspect 19: The method of Aspect 18, wherein the control plane message includes an indication of the section type that is dedicated for information that applies to all resource blocks and spatial layers in a group of carriers or band sectors, and a section header associated with the section type, wherein the section header includes the information that applies to all resource blocks and spatial layers in the indicated group of carriers or band sectors.

Aspect 20: The method of Aspect 19, wherein the section header includes an indication of an extended antenna-carrier (eAxC) mask that identifies the indicated group of carriers or band sectors to which the information included in the section header applies.

Aspect 21: The method of any of Aspects 19-20, wherein the information included in the section header includes a time domain duplex (TDD) configuration that applies to all resource blocks and spatial layers in the indicated group of carriers or band sectors.

Aspect 22: The method of any of Aspects 19-21, wherein the information included in the section header includes a pattern of idle and active symbols that applies to all resource blocks and spatial layers in the indicated group of carriers or band sectors.

Aspect 23: The method of any of Aspects 19-22, wherein the section header includes an indication of symbols, in a slot, for which the information included in the section header applies.

Aspect 24: The method of any of Aspects 18-23, wherein the information included in the control plane message includes analog beamforming information for the indicated group of carriers or band sectors.

Aspect 25: The method of Aspect 24, wherein the control plane message includes a section header associated with the section type that is dedicated for information that applies to all resource blocks and spatial layers in a group of carriers or band sectors, and wherein the analog beamforming information is included in an analog beamforming extension in the section header.

Aspect 26: The method of any of Aspects 24-25, wherein the analog beamforming information includes, for each carrier of the indicated group of carriers or band sectors, an indication of a respective analog beam that applies for all resource blocks and spatial layers in that carrier.

Aspect 27: The method of Aspect 26, wherein the indication of the respective analog beam, for each carrier of the indicated group of carriers or band sectors, includes an indication of a beam identifier for the respective analog beam, and wherein the beam identifier for the respective analog beam maps to a set of antenna element weights for the respective analog beam.

Aspect 28: A method of wireless communication performed by a distributed unit (DU), comprising: transmitting, to a radio unit (RU), a control plane message that includes analog beamforming information that applies to all resource blocks and spatial layers in one or more carriers.

Aspect 29: The method of Aspect 28, wherein the analog beamforming information includes, for each carrier of the one or more carriers, an indication of a respective analog beam that applies for all resource blocks and spatial layers in that carrier.

Aspect 30: The method of Aspect 29, wherein the indication of the respective analog beam, for each carrier of the one or more carriers, includes an indication of a beam identifier for the respective analog beam, and wherein the beam identifier for the respective analog beam maps to a set of antenna element weights for the respective analog beam.

Aspect 31: The method of any of Aspects 28-30, wherein the control plane message is associated with a section type that is dedicated for information that applies to all resource blocks and spatial layers in a group of carriers or band sectors.

Aspect 32: The method of any of Aspects 28-31, wherein the control plane message includes a section header associated with a section type that is dedicated for information that applies to all resource blocks and spatial layers in a group of carriers or band sectors, and wherein the analog beamforming information is included in an analog beamforming extension in the section header.

Aspect 33: An apparatus for wireless communication at a device, comprising a processor; memory coupled with the processor; and instructions stored in the memory and executable by the processor to cause the apparatus to perform the method of one or more of Aspects 1-11.

Aspect 34: An apparatus for wireless communication at a device, comprising a processor; memory coupled with the processor; and instructions stored in the memory and executable by the processor to cause the apparatus to perform the method of one or more of Aspects 12-17.

Aspect 35: An apparatus for wireless communication at a device, comprising a processor; memory coupled with the processor; and instructions stored in the memory and executable by the processor to cause the apparatus to perform the method of one or more of Aspects 18-27.

Aspect 36: An apparatus for wireless communication at a device, comprising a processor; memory coupled with the processor; and instructions stored in the memory and executable by the processor to cause the apparatus to perform the method of one or more of Aspects 28-32.

Aspect 37: A device for wireless communication, comprising a memory and one or more processors coupled to the memory, the one or more processors configured to perform the method of one or more of Aspects 1-11.

Aspect 38: A device for wireless communication, comprising a memory and one or more processors coupled to the memory, the one or more processors configured to perform the method of one or more of Aspects 12-17.

Aspect 39: A device for wireless communication, comprising a memory and one or more processors coupled to the memory, the one or more processors configured to perform the method of one or more of Aspects 18-27.

Aspect 40: A device for wireless communication, comprising a memory and one or more processors coupled to the memory, the one or more processors configured to perform the method of one or more of Aspects 28-32.

Aspect 41: An apparatus for wireless communication, comprising at least one means for performing the method of one or more of Aspects 1-11.

Aspect 42: An apparatus for wireless communication, comprising at least one means for performing the method of one or more of Aspects 12-17.

Aspect 43: An apparatus for wireless communication, comprising at least one means for performing the method of one or more of Aspects 18-27.

Aspect 44: An apparatus for wireless communication, comprising at least one means for performing the method of one or more of Aspects 28-32.

Aspect 45: A non-transitory computer-readable medium storing code for wireless communication, the code comprising instructions executable by a processor to perform the method of one or more of Aspects 1-11.

Aspect 46: A non-transitory computer-readable medium storing code for wireless communication, the code comprising instructions executable by a processor to perform the method of one or more of Aspects 12-17.

Aspect 47: A non-transitory computer-readable medium storing code for wireless communication, the code comprising instructions executable by a processor to perform the method of one or more of Aspects 18-27.

Aspect 48: A non-transitory computer-readable medium storing code for wireless communication, the code comprising instructions executable by a processor to perform the method of one or more of Aspects 28-32.

Aspect 49: A non-transitory computer-readable medium storing a set of instructions for wireless communication, the set of instructions comprising one or more instructions that, when executed by one or more processors of a device, cause the device to perform the method of one or more of Aspects 1-11.

Aspect 50: A non-transitory computer-readable medium storing a set of instructions for wireless communication, the set of instructions comprising one or more instructions that, when executed by one or more processors of a device, cause the device to perform the method of one or more of Aspects 12-17.

Aspect 51: A non-transitory computer-readable medium storing a set of instructions for wireless communication, the set of instructions comprising one or more instructions that, when executed by one or more processors of a device, cause the device to perform the method of one or more of Aspects 18-27.

Aspect 52: A non-transitory computer-readable medium storing a set of instructions for wireless communication, the set of instructions comprising one or more instructions that, when executed by one or more processors of a device, cause the device to perform the method of one or more of Aspects 28-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A radio unit (RU) for wireless communication, comprising:
   a memory; and
   one or more processors, coupled to the memory, configured to:
      receive, from a distributed unit (DU), a control plane message indicating a section type that is indicative that the control plane message includes information that applies to multiple spatial layers,
         wherein a header of the control plane message includes a direction pattern field that indicates a time domain duplex (TDD) configuration that applies to the multiple spatial layers, the direction pattern field including a plurality of bits that indicate a respective uplink direction or downlink direction for symbols of a slot; and
      communicate using the information that applies to the multiple spatial layers based at least in part on the section type.

2. The RU of claim 1, wherein the control plane message includes a section header associated with the section type, wherein the section header includes the information that applies to the multiple spatial layers.

3. The RU of claim 2, wherein the section header includes an indication of an extended antenna-carrier (eAxC) mask that identifies the multiple spatial layers to which the information included in the section header applies.

4. The RU of claim 2, wherein the information included in the section header includes the TDD configuration.

5. The RU of claim 2, wherein the information included in the section header includes a pattern of idle and active symbols that applies to the multiple spatial layers.

6. The RU of claim 1, wherein the control plane message includes a section header that includes an indication of symbols, in a slot, for which the information included in the section header applies.

7. The RU of claim 1, wherein the information included in the control plane message includes analog beamforming information for the multiple spatial layers.

8. The RU of claim 7, wherein the control plane message includes a section header associated with the section type, and wherein the analog beamforming information is included in an analog beamforming extension in the section header.

9. The RU of claim 7, wherein the analog beamforming information includes, for each carrier of an indicated group of carriers or band sectors, an indication of a respective analog beam that applies for all resource blocks and spatial layers in that carrier.

10. The RU of claim 9, wherein the indication of the respective analog beam, for each carrier of the indicated group of carriers or band sectors, includes an indication of a beam identifier for the respective analog beam, and wherein the beam identifier for the respective analog beam maps to a set of antenna element weights for the respective analog beam.

11. The RU of claim 1, wherein the one or more processors are further configured to:
   communicate with a user equipment (UE) using one or more beams resulting from beamforming based at least in part on the information that applies to the multiple spatial layers.

12. A radio unit (RU) for wireless communication, comprising:
   a memory; and
   one or more processors, coupled to the memory, configured to:
      receive, from a distributed unit (DU), a control plane message that includes analog beamforming information that applies to multiple spatial layers based at least in part on a section type indicated by the control plane message, the section type being indicative that the control plane message includes information that applies to the multiple spatial layers, wherein a header of the control plane message includes a direction pattern field that indicates a time domain duplex (TDD) configuration that applies to the multiple spatial layers, the direction pattern field including a plurality of bits that indicate a respective uplink direction or downlink direction for symbols of a slot; and communicate using the analog beamforming information that applies to the multiple spatial layers based at least in part on the section type.

13. The RU of claim 12, wherein the analog beamforming information includes, for each carrier of one or more carriers, an indication of a respective analog beam that applies for all resource blocks and spatial layers in that carrier.

14. The RU of claim 13, wherein the indication of the respective analog beam, for each carrier of the one or more carriers, includes an indication of a beam identifier for the respective analog beam, and wherein the beam identifier for the respective analog beam maps to a set of antenna element weights for the respective analog beam.

15. The RU of claim 12, wherein the section type is dedicated for information that applies to all resource blocks and spatial layers in a group of carriers or band sectors.

16. The RU of claim 12, wherein the control plane message includes a section header associated with the section type, and wherein the analog beamforming information is included in an analog beamforming extension in the section header.

17. The RU of claim 12, wherein the one or more processors are further configured to:
communicate with a user equipment (UE) using one or more beams resulting from the beamforming.

18. A method of wireless communication performed by a radio unit (RU), comprising:
receiving, from a distributed unit (DU), a control plane message indicating a section type that is indicative that the control plane message includes information that applies to multiple spatial layers,
wherein a header of the control plane message includes a direction pattern field that indicates a time domain duplex (TDD) configuration that applies to the multiple spatial layers, the direction pattern field including a plurality of bits that indicate a respective uplink direction or downlink direction for symbols of a slot; and
communicating using the information that applies to the multiple spatial layers based at least in part on the section type.

19. The method of claim 18, wherein the control plane message includes a section header associated with the section type, wherein the section header includes the information that applies to the multiple spatial layers.

20. The method of claim 19, wherein the section header includes an indication of an extended antenna-carrier (eAxC) mask that identifies the multiple spatial layers to which the information included in the section header applies.

21. The method of claim 19, wherein the information included in the section header includes the TDD configuration.

22. The method of claim 19, wherein the information included in the section header includes a pattern of idle and active symbols that applies to the multiple spatial layers.

23. The method of claim 18, wherein the control plane message includes a section header that includes an indication of symbols, in a slot, for which the information included in the section header applies.

24. The method of claim 18, wherein the information included in the control plane message includes analog beamforming information for the multiple spatial layers.

25. The method of claim 24, wherein the control plane message includes a section header associated with the section type, and wherein the analog beamforming information is included in an analog beamforming extension in the section header.

26. The method of claim 24, wherein the analog beamforming information includes, for each carrier of an indicated group of carriers or band sectors, an indication of a respective analog beam that applies for all resource blocks and spatial layers in that carrier.

27. A method of wireless communication performed by a radio unit (RU), comprising:
receiving, from a distributed unit (DU), a control plane message that includes analog beamforming information that applies to multiple spatial layers based at least in part on a section type indicated by the control plane message, the section type being indicative that the control plane message includes information that applies to the multiple spatial layers,
wherein a header of the control plane message includes a direction pattern field that indicates a time domain duplex (TDD) configuration that applies to the multiple spatial layers, the direction pattern field including a plurality of bits that indicate a respective uplink direction or downlink direction for symbols of a slot; and
communicating using the analog beamforming information that applies to the multiple spatial layers based at least in part on the section type.

28. The method of claim 27, wherein the analog beamforming information includes, for each carrier of one or more carriers, an indication of a respective analog beam that applies for all resource blocks and spatial layers in that carrier.

29. The method of claim 28, wherein the indication of the respective analog beam, for each carrier of the one or more carriers, includes an indication of a beam identifier for the respective analog beam, and wherein the beam identifier for the respective analog beam maps to a set of antenna element weights for the respective analog beam.

30. The method of claim 27, wherein the control plane message includes a section header associated with the section type, and wherein the analog beamforming information is included in an analog beamforming extension in the section header.

* * * * *